United States Patent
Olive

(10) Patent No.: US 10,412,153 B2
(45) Date of Patent: Sep. 10, 2019

(54) METHODS AND SYSTEMS FOR FACILITATING INFORMATION AND EXPERTISE DISTRIBUTION VIA A COMMUNICATIONS NETWORK

(71) Applicant: Bentley J. Olive, Apex, NC (US)

(72) Inventor: Bentley J. Olive, Apex, NC (US)

( * ) Notice: Subject to any disclaimer, the term of this patent is extended or adjusted under 35 U.S.C. 154(b) by 64 days.

(21) Appl. No.: 15/432,882

(22) Filed: Feb. 14, 2017

(65) Prior Publication Data

US 2017/0237806 A1    Aug. 17, 2017

Related U.S. Application Data

(60) Provisional application No. 62/295,137, filed on Feb. 14, 2016.

(51) Int. Cl.
  *H04L 29/08* (2006.01)
  *G06Q 30/00* (2012.01)

(52) U.S. Cl.
  CPC ............. *H04L 67/10* (2013.01); *G06Q 30/00* (2013.01); *H04L 67/18* (2013.01); *H04L 67/306* (2013.01)

(58) Field of Classification Search
  CPC ....... H04L 67/10; H04L 67/305; H04L 67/18; G06Q 30/00
  USPC .................................................. 709/227, 238
  See application file for complete search history.

(56) References Cited

U.S. PATENT DOCUMENTS

| | | | |
|---|---|---|---|
| 6,064,978 A | 5/2000 | Gardner et al. | |
| 6,697,849 B1* | 2/2004 | Carlson | G06F 9/54 709/203 |
| 7,013,303 B2* | 3/2006 | Faybishenko | G06F 17/30867 |
| 7,209,895 B2 | 4/2007 | Kundtz et al. | |
| 8,281,033 B1* | 10/2012 | Riordan | G06F 3/061 709/231 |
| 8,380,709 B1 | 2/2013 | Diller et al. | |
| 8,396,054 B2* | 3/2013 | Altberg | G06Q 30/02 370/352 |
| 8,438,386 B2* | 5/2013 | Hegli | G06F 21/577 709/216 |
| 8,521,688 B1* | 8/2013 | Belwadi | G06Q 30/02 707/622 |
| 2002/0065922 A1* | 5/2002 | Shastri | H04L 29/06 709/227 |
| 2002/0083179 A1* | 6/2002 | Shaw | G06F 17/30902 709/227 |
| 2003/0079056 A1* | 4/2003 | Taylor | H04L 45/00 710/1 |

(Continued)

*Primary Examiner* — Michael Won

(57) ABSTRACT

Disclosed herein are methods and systems for facilitating information and expertise distribution via a communication network. A method at a first computing device may include receiving a request for information from a second computing device, determining at least one third computing device based on an analysis of the request for information, communicating the request for information to the determined at least one third computing device, receiving a response corresponding to the request for information from the determined at least one third computing device, adjusting a credit level of a user associated with the determined at least one third computing device based on the received response, and communicating the response to the second computing device. The credit level of the user may indicate one or more credits earned by the user.

20 Claims, 23 Drawing Sheets

(56) References Cited

U.S. PATENT DOCUMENTS

| | | | |
|---|---|---|---|
| 2006/0184617 A1* | 8/2006 | Nicholas | G06Q 30/02 709/203 |
| 2007/0250383 A1 | 10/2007 | Tollinger et al. | |
| 2008/0058999 A1* | 3/2008 | Khodorkovsky | G06F 1/206 700/297 |
| 2008/0255977 A1* | 10/2008 | Altberg | G06F 17/30979 705/35 |
| 2010/0332615 A1* | 12/2010 | Short | H04L 63/08 709/217 |
| 2011/0082881 A1* | 4/2011 | Chunilal | G06F 17/30867 707/770 |
| 2012/0207098 A1* | 8/2012 | Cooley | H04L 67/34 370/329 |
| 2013/0279326 A1* | 10/2013 | Dunne | H04L 41/5025 370/228 |
| 2014/0122574 A1* | 5/2014 | Lee | H04L 67/1002 709/203 |
| 2014/0244712 A1* | 8/2014 | Walters | H04L 67/10 709/202 |
| 2014/0372529 A1* | 12/2014 | Marcucci | H04W 4/21 709/204 |
| 2015/0254248 A1* | 9/2015 | Burns | H04L 67/16 707/749 |
| 2016/0094445 A1* | 3/2016 | Sella | H04L 69/16 370/401 |
| 2016/0255139 A1* | 9/2016 | Rathod | H04L 67/22 709/203 |
| 2017/0078186 A1* | 3/2017 | Thyni | H04L 45/124 |
| 2017/0200342 A1* | 7/2017 | Meyerhofer | G07F 17/3204 |
| 2017/0237806 A1* | 8/2017 | Olive | G06Q 30/00 709/223 |
| 2018/0139606 A1* | 5/2018 | Green | H04W 12/06 |
| 2018/0185759 A1* | 7/2018 | Torres | A63F 13/795 |

* cited by examiner

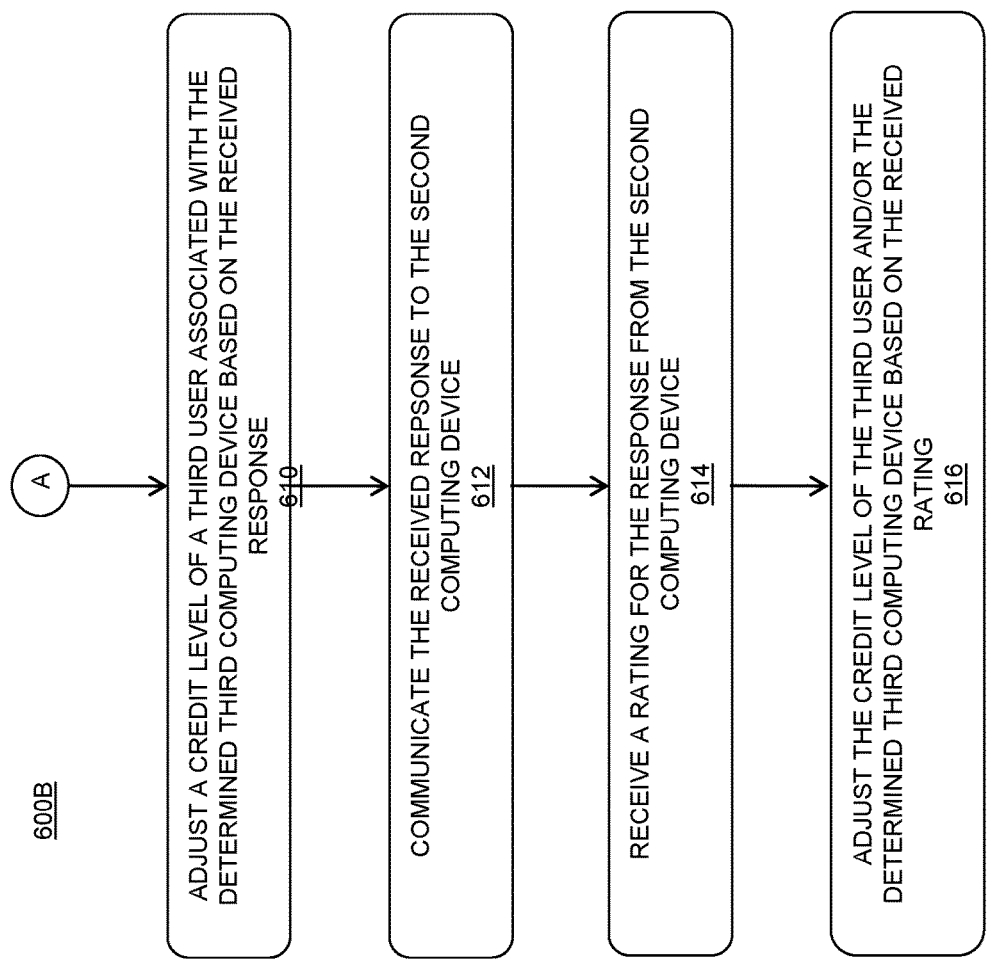

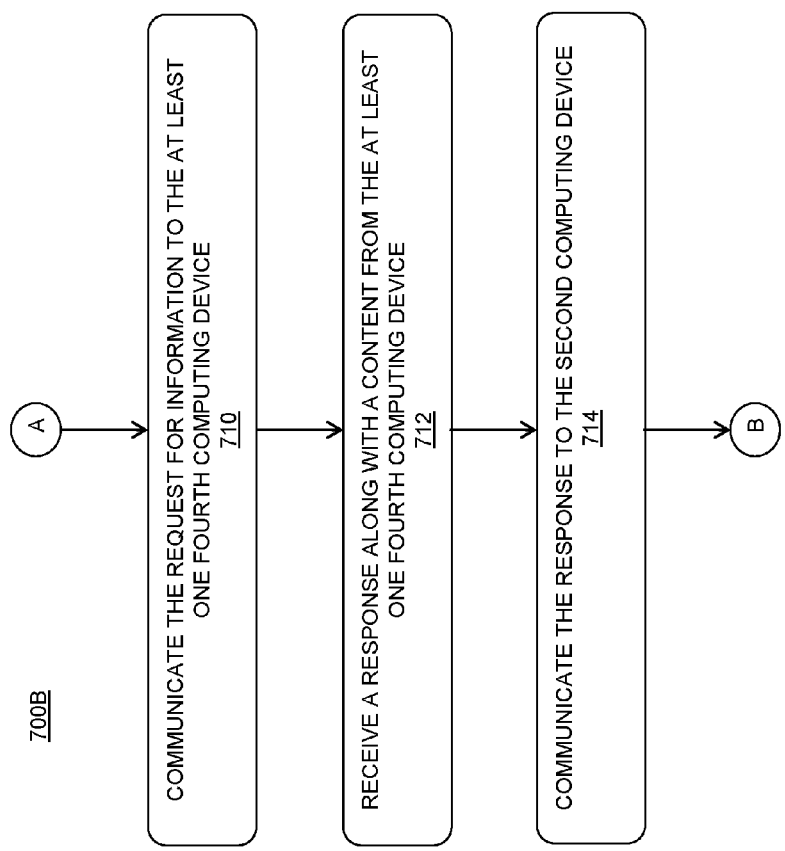

METHODS AND SYSTEMS FOR FACILITATING INFORMATION AND EXPERTISE DISTRIBUTION VIA A COMMUNICATIONS NETWORK

CROSS REFERENCE TO RELATED APPLICATION

This application claims priority to U.S. Provisional Patent Application No. 62/295,137, filed on Feb. 14, 2016, and titled METHODS AND SYSTEMS FOR FACILITATING INFORMATION AND EXPERTISE DISTRIBUTION VIA A COMMUNICATIONS NETWORK; the content of which is hereby incorporated by reference herein in its entirety.

TECHNICAL FIELD

The present disclosure generally relates to network communications. Particularly, the present subject matter relates to methods and systems for facilitating information and expertise distribution via a communication network.

BACKGROUND

Use of the Internet and other communication networks to share information has increased dramatically over time. As Internet publishing and communication tools improved, more content is available and shared online. In addition, as more content is published, more services emerge to help people and businesses to find and consume that content. As the amount of content increased, search engines such as the GOOGLE® search engine available from Google Inc. and the YAHOO!® search engine available from Yahoo! Inc. became available to make it easier for users to seek, search, and consume content.

Currently, there exist many techniques for sharing or distributing information via the Internet or other communications networks. More recently, content may be shared and distributed by use of tools such as website links, text messaging, and email. In addition, social networking websites such as FACEBOOK® social network service available from Facebook, Inc., TWITTER® social network service available from Twitter, Inc., and INSTAGRAM® social network service available from Instagram, LLC have made it easier for people to share content. Further, for example, various websites can provide content via websites. Moreover, there are search engines for helping users to find websites as per his/her interests. In addition, there are many existing platforms such as blogs, webcasts, podcasts, and the like to allow the user to publish content via the Internet.

The existing techniques for sharing information suffer from multiple limitations. For example, the existing information sharing techniques are very static and do not allow a user to easily and quickly request information, knowledge, and expertise of others via a communications network. Therefore, there is a continuing need for improved techniques and systems for facilitating information and expertise distribution.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Disclosed herein are various embodiments of the present disclosure providing methods, systems, and computer program products for facilitating information and expertise via a communications network.

Disclosed herein are methods and systems for facilitating information and expertise distribution via a communication network. A method at a first computing device may include receiving a request for information from a second computing device, determining at least one third computing device based on an analysis of the request for information, communicating the request for information to the determined at least one third computing device, receiving a response corresponding to the request for information from the determined at least one third computing device, adjusting a credit level of a user associated with the determined at least one third computing device based on the received response, and communicating the response to the second computing device. The credit level of the user may indicate one or more credits earned by the user.

BRIEF DESCRIPTION OF THE DRAWINGS

The foregoing summary, as well as the following detailed description of preferred embodiments, is better understood when read in conjunction with the appended drawings. For the purposes of illustration, there is shown in the drawings exemplary embodiments; however, the present disclosure is not limited to the specific methods and instrumentalities disclosed. In the drawings:

FIGS. 11A and 11B illustrate a flowchart of an example method for facilitating information and expertise distribution via a communications network in accordance with embodiments of the present disclosure;

FIGS. 12A-12C illustrate a flowchart of an example method for finding a computing device for directing a request for information based on an analysis of the request for information in a network, in accordance with an embodiment of the present disclosure;

DETAILED DESCRIPTION

Figure 1:
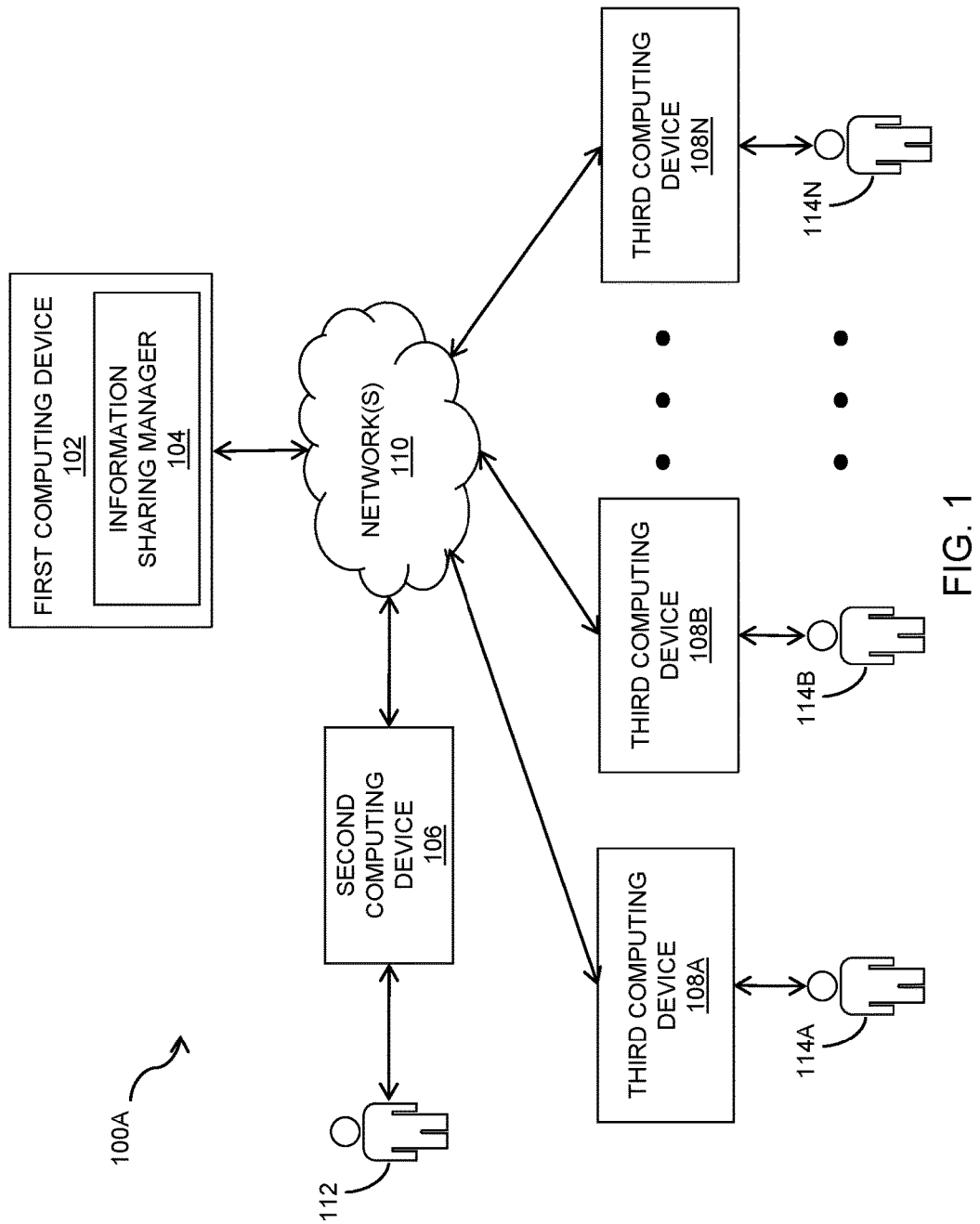
FIG. 1 is a schematic diagram of an example system within which various components may function in accordance with embodiments of the present disclosure.

The present disclosure is described with specificity to meet statutory requirements. However, the description itself is not intended to limit the scope of this patent. Rather, the inventor has contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

The functional units described in this specification have been labeled as systems or devices. A device or a system may be implemented in programmable hardware devices such as processors, digital signal processors, central processing units, field programmable gate arrays, programmable array logic, programmable logic devices, cloud processing systems, or the like. The devices may also be implemented in software for execution by various types of processors. An identified device may include executable code and may, for instance, comprise one or more physical or logical blocks of computer instructions, which may, for instance, be organized as an object, procedure, function, or other construct. Nevertheless, the executable of an identified device need not be physically located together, but may comprise disparate instructions stored in different locations which, when joined logically together, comprise the device and achieve the stated purpose of the device.

Indeed, an executable code of a device could be a single instruction, or many instructions, and may even be distributed over several different code segments, among different applications, and across several memory devices. Similarly, operational data may be identified and illustrated herein within the device, and may be embodied in any suitable form and organized within any suitable type of data structure. The operational data may be collected as a single data set, or may be distributed over different locations including over different storage devices, and may exist, at least partially, as electronic signals on a system or network.

The described features, structures, or characteristics may be combined in any suitable manner in one or more embodiments. In the following description, numerous specific details are provided, to provide a thorough understanding of embodiments of the disclosed subject matter. One skilled in the relevant art will recognize, however, that the disclosed subject matter can be practiced without one or more of the specific details, or with other methods, components, materials, etc. In other instances, well-known structures, materials, or operations are not shown or described in detail to avoid obscuring aspects of the disclosed subject matter.

Devices and systems disclosed herein may be implemented by software, hardware, firmware, or a combination thereof. A device or a system may include or may be implemented by software or computer programs capable of performing the various heretofore-disclosed functions. For example, exemplary embodiments are intended to cover all software or computer programs capable of enabling one or more processors to implement the disclosed processes. Exemplary embodiments are also intended to cover any and all currently known, related art or later developed non-transitory recording or storage mediums (such as a CD-ROM, DVD-ROM, hard drive, RAM, ROM, floppy disc, magnetic tape cassette, and the like) that record or store such software or computer programs. Exemplary embodiments are further intended to cover such software, computer programs, systems and/or processes provided through any other currently known, related art, or later developed medium (such as transitory mediums, carrier waves, etc.), usable for implementing the exemplary operations disclosed below.

In accordance with embodiments disclosed herein, computer programs can be executed in many exemplary ways, such as an application that is resident in the memory of a device or as a hosted application that is being executed on a server and communicating with the device application or browser via a number of standard protocols, such as TCP/IP, HTTP, XML, SOAP, REST, JSON and other sufficient protocols. The disclosed computer programs can be written in exemplary programming languages that execute from memory on the device or from a hosted server, such as BASIC, COBOL, C, C++, Java, Pascal, or scripting languages such as JavaScript, Python, Ruby, PHP, Perl or other sufficient programming languages.

As referred to herein, the term "computing device" should be broadly construed. It can include any type of computing device such as, but not limited to, a desktop computer, a laptop computer, a tablet computer, a smartphone, a server, and the like. Other examples include a cell phone, a pager, a personal digital assistant (PDA, e.g., with GPRS NIC), a computer with a smart phone client, a television, a wireless communication-enabled photo frame, or the like. A typical mobile computing device may be a wireless data access-enabled device (e.g., an iPHONE® smart phone, a BLACKBERRY® smart phone, a NEXUS ONE™ smart phone, an iPAD® device, or the like) that is capable of sending and receiving data in a wireless manner using protocols like the Internet Protocol, or IP, and the wireless application protocol, or WAP. This allows users to access information via wireless devices, such as smart phones, mobile phones, pagers, two-way radios, communicators, and the like. Wireless data access is supported by many wireless networks, including, but not limited to, CDPD, CDMA, GSM, PDC, PHS, TDMA, FLEX, ReFLEX, iDEN, TETRA, DECT, DataTAC, Mobitex, EDGE and other 2G, 3G, 4G and LTE technologies, and it operates with many handheld device operating systems, such as PalmOS, EPOC, Windows CE, FLEXOS, OS/9, JavaOS, iOS and Android. Typically, these devices use graphical displays and can access the Internet (or other communications network) on so-called mini- or micro-browsers, which are web browsers with small file sizes that can accommodate the reduced memory constraints of wireless networks, or other client applications. In a representative embodiment, the mobile device is a cellular telephone or smart phone that operates over GPRS (General Packet Radio Services), which is a data technology for GSM networks. In addition to a conventional voice communication, a given mobile device can communicate with another such device via many different types of message transfer techniques, including SMS (short message service), enhanced SMS (EMS), multi-media message (MMS), email WAP, paging, or other known or later-developed wireless data formats. Although many of the examples provided herein are implemented on a mobile device, the examples may similarly be implemented on any suitable computing device.

Some of the disclosed embodiments include or otherwise involve data transfer over a communications network, such as communicating various inputs or files over the network. The network may include, for example, one or more of the Internet, Wide Area Networks (WANs), Local Area Networks (LANs), analog or digital wired and wireless telephone networks (e.g., a PSTN, Integrated Services Digital Network (ISDN), a cellular network, and Digital Subscriber Line (xDSL)), radio, television, cable, satellite, and/or any other delivery or tunneling mechanism for carrying data. The network may include multiple networks or sub networks, each of which may include, for example, a wired or wireless data pathway. The network may include a circuit-switched voice network, a packet-switched data network, or any other network able to carry electronic communications. For example, the network may include networks based on the Internet protocol (IP) or asynchronous transfer mode (ATM), and may support voice using, for example, VoIP, Voice-over-ATM, or other comparable protocols used for voice data communications. In one implementation, the network includes a cellular telephone network configured to enable exchange of text or SMS messages.

Examples of a network may also include, but are not limited to, a personal area network (PAN), a storage area network (SAN), a home area network (HAN), a campus area network (CAN), a local area network (LAN), a wide area network (WAN), a metropolitan area network (MAN), a virtual private network (VPN), an enterprise private network (EPN), Internet, a global area network (GAN), and so forth.

As referred to herein, an "interface" is generally a system by which users interact with a computing device. An interface can include an input for allowing users to manipulate a computing device, and can include an output for allowing the system to present information and/or data, indicate the effects of the user's manipulation, etc. An example of an interface on a computing device (e.g., a mobile device) includes a graphical user interface (GUI) that allows users to interact with programs in more ways than typing. A GUI typically can offer display objects, and visual indicators, as opposed to text-based interfaces, typed command labels or text navigation to represent information and actions available to a user. For example, an interface can be a display window or display object, which is selectable by a user of a mobile device for interaction. The display object can be displayed on a display screen of a mobile device and can be selected by and interacted with by a user using the interface. In an example, the display of the mobile device can be a touch screen, which can display the display icon. The user can depress the area of the display screen at which the display icon is displayed for selecting the display icon. In another example, the user can use any other suitable interface of a mobile device, such as a keypad, to select the display icon or display object. For example, the user can use a track ball or arrow keys for moving a cursor to highlight and select the display object.

Operating environments in which embodiments of the present disclosure may be implemented are also well known. In a representative embodiment, a computing device, such as a mobile device, is connectable (for example, via WAP) to a transmission functionality that varies depending on implementation. Thus, for example, where the operating environment is a wide area wireless network (e.g., a 2.5G network, a 3G network, or a 4G network), the transmission functionality comprises one or more components such as a mobile switching center (MSC) (an enhanced ISDN switch that is responsible for call handling of mobile subscribers), a visitor location register (VLR) (an intelligent database that stores on a temporary basis data required to handle calls set up or received by mobile devices registered with the VLR), a home location register (HLR) (an intelligent database responsible for management of each subscriber's records), one or more base stations (which provide radio coverage with a cell), a base station controller (BSC) (a switch that acts as a local concentrator of traffic and provides local switching to effect handover between base stations), and a packet control unit (PCU) (a device that separates data traffic coming from a mobile device). The HLR also controls certain services associated with incoming calls. Of course, the present disclosure may be implemented in other and next-generation mobile networks and devices as well. The mobile device is the physical equipment used by the end user, typically a subscriber to the wireless network. Typically, a mobile device is a 2.5G-compliant device, a 3G-compliant device, or a 4G-compliant device that includes a subscriber identity module (SIM), which is a smart card that carries subscriber-specific information, mobile equipment (e.g., radio and associated signal processing devices), a user interface (or a man-machine interface (MMI)), and one or more interfaces to external devices (e.g., computers, PDAs, and the like). The mobile device may also include a memory or data store.

In another exemplary operating environment, the computing devices described herein may communicate with each other in any suitable wired or wireless communications network. For example, the computing devices may include suitable I/O communications hardware, software, and/or firmware for communicating with each other via a wireless communications network such as BLUETOOTH® technology or IEEE 802.11 technology. The computing devices may also be suitably equipped for wired communications with one another via, for example, a telephone line.

In various embodiments of the present disclosure, definitions of one or more terms that will be used in the document are provided below.

As used herein, a "request processing module" refers to a single or multiple modules or devices including a software, hardware, firmware or combination of these that is configured to process and analyze a number of request for information in a network. Example functions of a request processing module are described in further detail herein.

As used herein, a "communication module" refers to a single or multiple modules or devices including hardware, software, firmware, or combination thereof that can be configured to transmit and receive messages or information such as, requests for information and responses to the request for information to and from a number of computing devices in a communications network.

As used herein, a "credit level managing module" refers to a single or multiple modules or devices including hardware, software, firmware, or combination thereof that can be configured to assign or adjust a credit level of users or computing devices based on responses from the users. A credit level of a user may indicate one or more credits or points earned by the user. Example functions of a credit level managing module are described in further detail herein. It is noted that the terms "credit level" and "score" as referred to herein can have the same or similar meaning and are sometimes used interchangeably herein.

As used herein, a "response managing module" refers to a single or multiple modules or devices including hardware, software, firmware, or combination thereof that can be configured to maintain response credentials such as response identifier (ID), response, and so forth for computing devices. Example functions of a response managing module are described in further detail herein.

As used herein, a "ranking managing module" refers to a single or multiple modules or devices including hardware, software, firmware, or combination thereof that can be configured to maintain a ranking for each of the users associated with a number of computing devices based on a number of communication response credentials. A ranking of a user may be where a responding user ranks among other responding users. Example functions of a ranking managing module are described in further detail herein.

The presently disclosed subject matter is now described in more detail. For example, FIG. 1 illustrates a schematic diagram of an example system 100A within which various components may function in accordance with embodiments of the present disclosure. Referring to FIG. 1, the system 100A includes a number of computing devices, such as a first computing device 102, a second computing device 106 associated with a second user 112, and a number of third computing devices 108A-108N associated with a number of third users 114A-114N. More particularly, the computing devices 102, 106, and 108A-108N may be configured to communicate with each other via one or more communications networks 110. Although a limited number of computing devices are shown in FIG. 1, it is understood that there be any number of computing devices that can communicate with each other via the network(s) 110. For example, there are 1-N computing devices 114, and N may be any suitable number of computing devices.

As an example, a computing device may be configured to communicate text, images, video, or other data to another computing device as will be understood by those of skill in the art. Also, as will be understood by those of skill in the art, a user may use the user interface of his or her associated computing device for interacting with the computing device. For example, an application may reside on a computing device and the associated user may be able to interact with a user interface presented by the application as will be understood by those of skill in the art.

It is noted that each user shown in FIG. 1 may have specialized expertise, information, and knowledge. It is a function of the system 100A to facilitate and promote the networking of users 112 and 114A-114N for the sharing and exchange of such information, knowledge, and expertise. More particularly, it is a function of the system 100A to serve user requests for other users' information, knowledge, and expertise, and to communicate the requests to other selected users. In addition, it is a function of the system 100A to promote responses from the other users to requests. Further, the system 100A can provide for the receipt of others' specialized information, knowledge, and expertise of others in a timely manner while also promoting the others to provide such specialized information, knowledge, and expertise. Details about the implementation of these and other functions may be implemented by the system 100A are described herein. Also, other example systems and methods for implementing these and other functions are described herein.

The first computing device 102 may be any suitable computing device configured to communicate with the network 110 and communicate with other devices, such as the second computing device 106 and the third computing devices 108A-108N, connected to the network 110. The network 110 may be a wired network, a wireless network or combination thereof. Examples of the first computing device 102, second computing device 106, and the third computing devices 108A-108N may include, such as, but are not limited to, a smartphone, a desktop computer, a laptop computer, a smart phone, a personal digital assistant (PDA), a tablet computer, a smart television, a television, and the like.

In embodiments, the first computing device 102 may be a server configured to enable other computing devices 106 and 108A-108N to interact with each other as described herein. Also, it should be understood that the functionality of the first computing device 102 may be implemented by one or more computing devices, such as multiple servers either distributed or operating together in a server farm. Further, the second computing device 106 and the third computing device 108A-108N may include an associated display device such as, a screen for displaying information. The second user 112 may access a browsing application such as, but not limited to, Google Chrome, Internet Explorer, Mozilla Firefox, and so forth on the second computing device 106. Similarly, the third computing devices 108A-108N may include a browsing application. In another example, the computing device 102 may be an application server configured to manage and interact with applications residing on computing devices 106 and 108A-108N.

In an example use, the second user 112 may request information from other computing devices 102, 108A-108N in the network 110 by using the second computing device 106. For example, a user interface of the second computing device 106 may present an interface for the second user 112 to enter information for communicating a request to the first computing device 102. The first computing device 102 may select or determine one or more of the third computing devices 108A-108N to send the request based on an analysis of the request. The second user 112 may enter one or more inputs into user interface of the second computing device 106.

Figure 2:
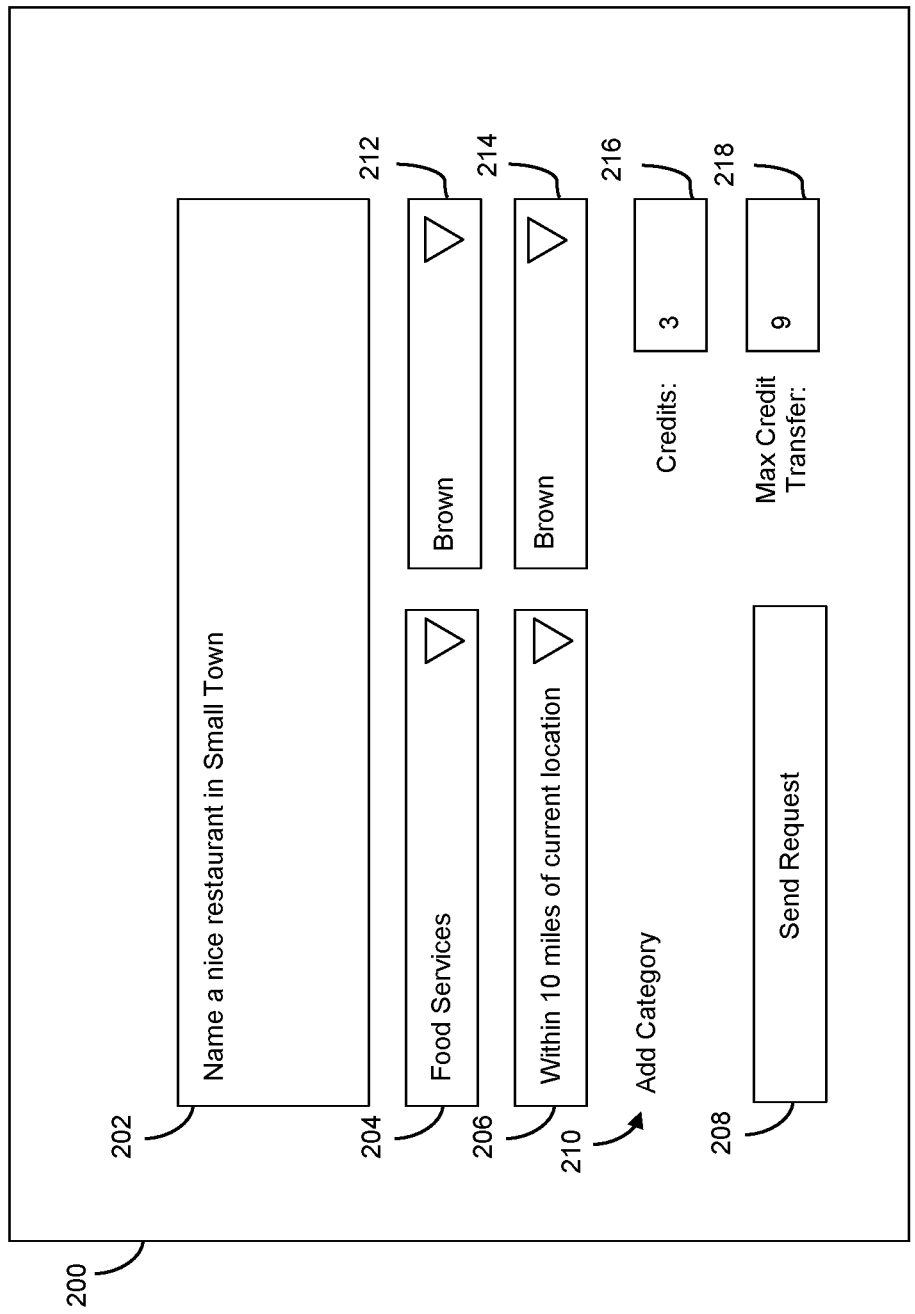
FIG. 2 is a screen display of an example display in accordance with embodiments of the present disclosure.

FIG. 2 illustrates a screen display of an example display 200 in accordance with embodiments of the present disclosure. The display 200 may be the display of the computing device 106 shown in FIG. 1, or any other suitable computing device. Referring to FIG. 2, the display 200 may present various display portions where a user can be presented with information and/or the user may enter information. For example, a text box 202 may be displayed and may be operated by an application residing on the computing device to receive entry of text by the user as will be understood by those of skill in the art. The entered text may be a part of or the entirety of a request sent to one or more other computing devices. In this example, the entered text is a request for the name of a nice restaurant in "Small Town," a town name made up for purpose of this example.

With continuing reference to FIG. 2, the display 200 may display dropdown menus 204 and 206 with which a user may interact for selecting categories for further specifying a request. Although, only two dropdown menus are shown in this example, it should be understood that any number of dropdown menus and/or other interactive elements may be utilized for selecting categories or otherwise specifying a request. In this example, a user may add another category by selection of the text "Add Category" 210.

In the example of FIG. 2, the user selected the categories "Food Services" and "Within 10 miles of current location". By selection of the "Food Services" category, the request may be directed to other users determined to have an affinity to requests in this category. In an example, these may be users who rank highly for responses to requests in the food services category. Also, by selection of the "Within 10 miles of current location" category, the request may be limited to or limited to other users determined to have an affinity to requests originating from within 10 miles of the user or computing device's current location (which may be determined by, for example, a GPS receiver of the computing device).

Subsequent to entry of text in text box 202 and selection of categories, a user may select button 208 for instructing the computing device application to communicate the request. For example, the request may be communicated to the computing device 102 shown in FIG. 1 via the network(s) 110. In this example, the communicated request may include the text entered in text box 202, the category of "Food Services," and the category of "Within 10 miles of current location". The request may also include an identifier of the user, location of the computing device, and/or other information.

FIG. 2 provides a particular example of the creation of a request by a user by use of a computing device having a display. It should be understood that a computing device may be used in any other suitable way for entering the same or other information for a request in accordance with embodiments of the present disclosure.

With reference again to FIG. 1, the first computing device 102 may be configured to receive a request from the second computing device 106. For example, the first computing device 102 may include a communications module configured to receive the request generated in the example of FIG. 2. Further, the first computing device 102 may include an information sharing manager 104 configured to receive and analyze the request from the second computing device 106. The information sharing manager 104 may analyze the request and determine one or more of the third computing devices 108A-108N to send the request based on the analysis. Using the example of FIG. 2, the information sharing manager 104 may direct the request to users present at a location within 10 miles of the second computing device 106, or otherwise associated with or having an affinity to the geographic area within the 10 miles of the second computing device 106. The recipient computing device may also be those that have an affinity to the category "Food Services". In other words, recipient computing devices may be those having some affinity or some other association with the defined geographic area and food services. Further details and examples for determining recipient computing device(s) based on a request are described herein.

In an example, the request may be sent to all the third computing devices 108A-108N via the network(s) 110. In other examples, the request for information may be sent to only one or some of the third computing devices 108A-108N. In some embodiments, the first computing device 102 determines the one or more of the third computing devices 108A-108N based on one or more determining factors such as, but not limited to, a geographic location of the second computing device 106 or/and of the one or more of the third computing devices 108A-108N, an interest of the third users 114, a rating of the third users 114A-114N or of the computing devices 108A-108N, educational background of the third users 114A-114N, a time when the request for information is received, an availability of the on or more third users 114A-114N associated with the one or more of the third computing devices 108A-108N, or other criteria. In another example, the computing device 102 may forward the requests related to programming languages to a software engineer.

In embodiments of the present disclosure, the information sharing manager 104 may be configured to associate a work claim ticket with the request for information. The work claim ticket may be an identifier used for identifying the request for information. The work claim ticket may also include details of the request for information such as, but not limited to, upper limit for responding to the request, credits for responding to the request, and so forth.

In embodiments of the present disclosure, the request may be communicated to the determined third computing devices 108A-108N automatically by the first computing device 102, and the information sharing manager 104 may determine recipient computing devices based on an analysis of the request. Alternatively, the first computing device 102 may display a list including the determined one or more of the third computing devices 108A-108N on a display of the second computing device 106. Thereafter, the user 112 can choose to whom he/she wants the request to be directed. Based on the selection of the third computing devices 108A-108N by the second user 112 received from the second computing device 106, the first computing device 102 may communicate the request for information to the selected third computing device(s) 114.

The first computing device 102 may be configured to communicate or forward the request for information to the determined one or more or the third computing devices 108A-108N. The one or more of the third computing device 108A-108N may receive the request for processing and may generate a response to the request. The request may be suitably presented to a user of a recipient computing device 108 via a user interface, such as a display.

Figure 3:
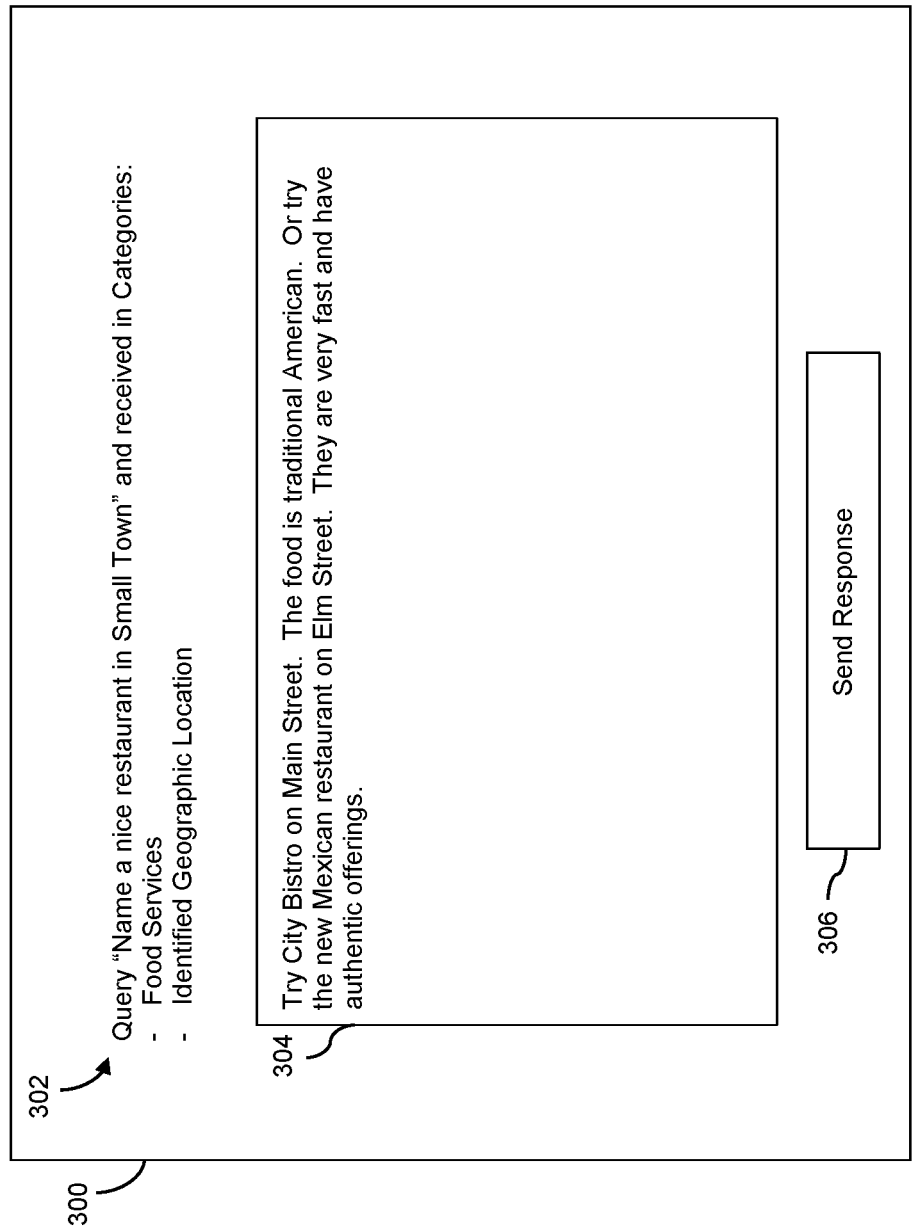
FIG. 3 is a screen display of an example display in accordance with embodiments of the present disclosure.

FIG. 3 illustrates a screen display of an example display 300 in accordance with embodiments of the present disclosure. The display 300 may be the display of a recipient computing device, such as one of the third computing devices 108A-108N shown in FIG. 1, or any other suitable computing device. This example is a continuation of the example of FIG. 2. Referring to FIG. 3, the display 300 may present various display portions where a user can be presented with information and/or the user may enter information. Reference number 302 indicates a display portion including text about the example request of FIG. 2. The text in portion 302 shows the text and categories of the request. Text box 304 provides an area for the user to type a response to the request as shown. It should be understood that information about the request may alternatively be presented in any other suitable way. Also, it should be understood that the user may alternatively input the response in any other suitable way. After entry of the response, the user may interact with the computing device to select the button 306 for instructing the computing device to communicate the response to the computing device 102 via the network(s) 110. In this example, the response may include the text entered in text box 304. The response may also include an identifier for the user or the user's computing device and any other information as described herein. The response may alternatively be entered via any suitable technique as will be understood by those of skill in the art.

The first computing device 102 may receive one or more responses from the recipient computing device(s) 108. The information sharing manager 104 may suitably process the response(s) and control communication of all or a portion of the response(s) to the second computing device 106. For example, the first computing device 106 may receive the response and present it to the user 112. In the example of FIGS. 2 and 3, a display of the second computing device 106 may display the text entered in the text box 304 of FIG. 3.

In accordance with embodiments of the present disclosure, credit level information and other information may be stored for each user. For example, credit level information may be stored and maintained in a database managed and operated by the first computing device 102 shown in FIG. 1. The maintenance and use of credit level information in accordance with embodiments of the present disclosure can provide incentive for users to respond to requests and thus promote the exchange information, knowledge, and expertise. Users may increase his or her credit level by responding to requests. In one example, the information sharing manager 104 can increase the credit level of a user when the user responds to a request. In another example, a requester can transfer his or her credits to a responder to thereby increase the credit level of the responder. In another example, a user may purchase credits that may be used to transfer to responders in exchange for their responses.

A credit level of a prospective responder may be indicative of the responder's timeliness of responding, quality of responses, and/or the like. For example, a prospective responder may have a high credit level, and this can indicate that the responder is better than others at responding to requests having a lower credit level. Responders may have a credit level assigned to them generally for his or her quality and timeliness of responses. In addition or alternatively, a credit level may be assigned to the responder in one or more categories. For example, a responder may have high credit level in the "Financial Advising" category. In this example, it may be presumed that this responder will be good at responding to requests identifying the "Financial Advising" category.

In embodiments, prospective responders may be ranked with respect to one another based on assigned credit levels. Responders may be generally ranked among each other based on their credit levels. In addition or alternatively, responders may be ranked in individual categories based on their credit levels in that category. The idea is that a responder may earn a high credit level by being responsive to other requests and by providing high quality responses. For example, a responder may have a history of providing timely and high quality responses, and as a result the user has received credits from other users and/or the information sharing manager. The receipt of credits can increase the user's credit level.

In an example, credit levels may be used for identifying responders who have achieved particular levels of achievement in responding to requests. A particular level ranges can be associated with a named achievement level group. For example, the credit level range of 0-99 for a responder in the "Financial Advising" category, and this credit level range can place the responder in a "White" achievement level group. The credit level range of 100-199 can be the "Green" achievement level group, the credit level range of 200-299 can be the "Brown" achievement level group, and the credit level range of 300 and higher can be the "Black" achievement level group. This color assignment for achievements is similar to achievement levels assigned in many martial arts.

In an example use of credit levels, a requester may indicate in his or her request that the request should only be sent to responders who have achieved a particular credit level or have been placed in a particular achievement level group. For example, the requester may indicate that he or she only wants the request sent to responders who have achieved at least a credit level range of 200 or "Brown" in the "Financial Advising" category. In this way, the responses to a request will be more limited in number than sending the request to all responders. This is depicted in the example of FIG. 2 where the "Brown" achievement level group is selected in dropdown menus 212 and 214, respectively, for both the "Food Services" category and the "Within 10 miles of current location category." In the alternative, no achievement level group may be selected such that the request may be sent to users that are not limited a particular achievement level group.

In accordance with embodiments, a requester may transfer credits to responders that meet certain criteria. In the example of FIG. 2, the requester entered 3 credits in textbox 216 as a credit transfer offer to responders who respond and that meet the criteria of having a "Brown" achievement level group in both the "Food Services" category and the "Within 10 miles of current location category." Thus, responders meeting these criteria and who send a response will receive 3 credits each as a transfer from the requester. The requester may also limit the maximum number of credits that can be transferred. In the example of FIG. 2, the requester limited the transfer of 9 credits total by entry of the number "9" in textbox 218. Therefore, in this example, a maximum of 3 responses would be sent to the requester. This can be used by a requester to avoid receiving too many responses for the agreed upon credit transfer and having to transfer more credits total than desired for the request.

Figure 4:
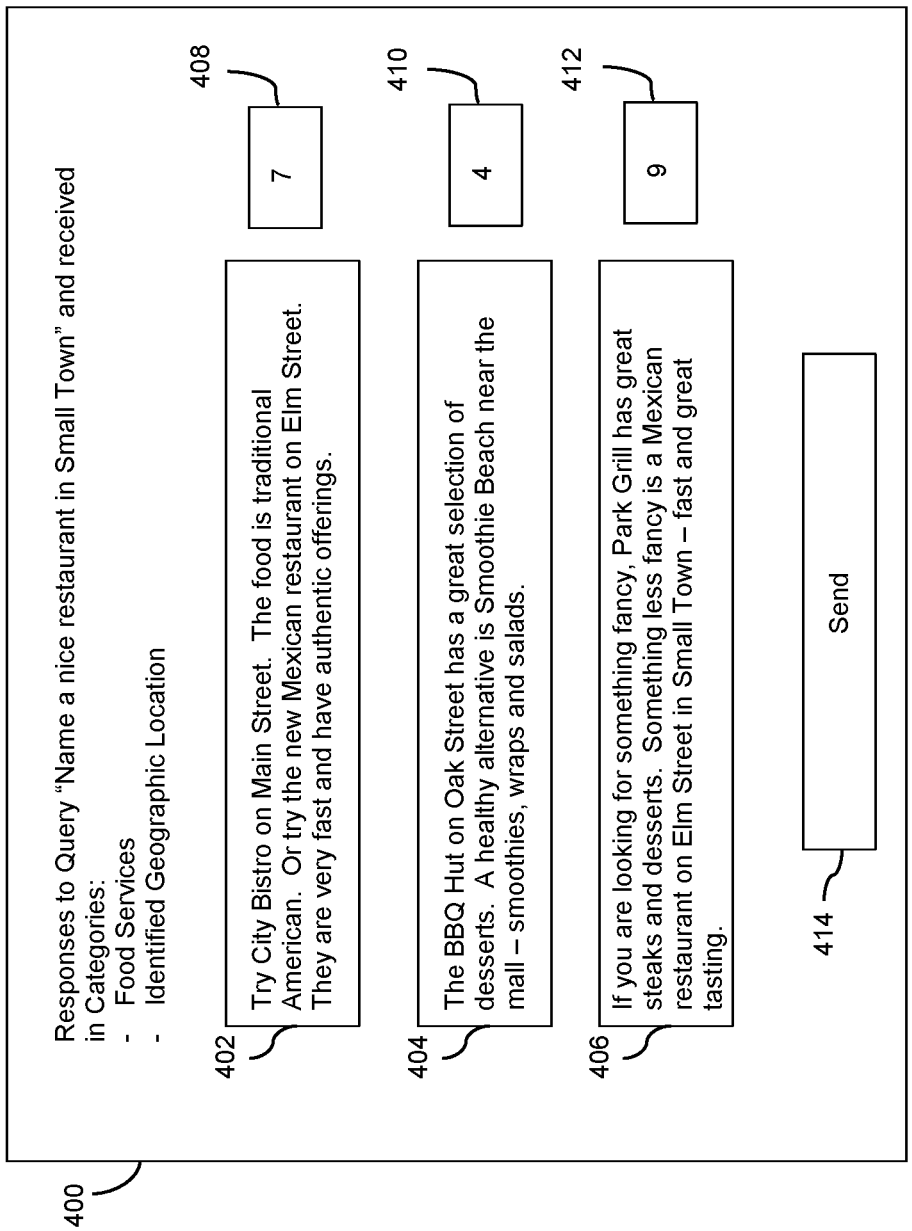
FIG. 4 is a screen display of an example display 400 in accordance with embodiments of the present disclosure.

In another example use of credit levels, credits levels assigned to responders may be used to rank responses their responses among other responders when presenting responses to a request to a requester. For example, a requester may send a request in a particular category. In this example, the requester may receive 3 responses. The 3 responders who sent the responses may have different credit levels. In this case, the 3 responses are presented to the requester, and an indication of a ranking of the responses based on the credit levels is provided. As an example, FIG. 4 illustrates a screen display of an example display 400 in accordance with embodiments of the present disclosure. The display 400 may be the display of a computing device of a requester having receiving responses, such as computing device 106 shown in FIG. 1, or any other suitable computing device. This example is a continuation of the example of FIGS. 2 and 3. Referring to FIG. 4, 3 responses are received and the text of the different responses are displayed respectively in boxes 402, 404, and 406. In this example, the responses are displayed from top to bottom in accordance with the credit levels of the responders in the category of either "Food Services" category and "Within 10 of current location category," or some combination of the credit levels assigned to the responder in those categories. In this way, a requester can quickly determine which response was received from a responder assigned a higher credit level than the other responders. To be clear, box 402 is associated with a credit level higher than boxes 404 and 406, and box 404 is associated with a credit level higher than box 406. The ranking can alternatively be presented in any other suitable way, such as providing a ranking number near the presented response.

In accordance with embodiments of the present disclosure, the quality and timeliness of a response to a request can increase or decrease a credit level of the responder. In an example, the credit level of a responder can be increased if the response is provided within a predetermined time period from the request, or within some range. Conversely, the credit level of a responder can be decreased if the response is provided slowly (e.g., not within a predetermined time period from the request) or not at all. In this way, responders are encouraged to provide timely responses because his or her credit level can be positively or negatively affected based on a timing of the response. The predetermined time period may be set by a requester when sending a request. For example, the requester may set for the response to be sent within 5 minutes of the request, and in that case the credit level of a responder who responds with 5 minutes can have his or her credit level increased by the timeliness of the response. The information sharing manager 104 shown in FIG. 1 may operate to determine the timeliness of a response and change the credit level accordingly.

Further, for example, the credit level of a responder can be increased in response to a determination that the response is of a high quality. Conversely, the credit level of a responder can be decreased in response to a determination that the response is of a low quality. The information sharing manager 104 shown in FIG. 1 may operate to determine the quality based on feedback received from a requester and/or other factors as disclosed herein. Further, the information sharing manager 104 may operate to change the credit level according to the determined quality.

Continuing the example of FIG. 4, the requester may use textboxes 408, 410, and 412 (associated with the responses in boxes 402, 404, and 406, respectively) to enter a quality rating for the responses 408, 410, and 412, respectively. In this example, the quality ratings may be 1-10 (with 10 being the highest quality rating and 1 being the lowest quality rating) or any other suitable metric for rating a response. In a particular example, the response in box 402 received a quality rating of 7 out of 10. The quality rating may be deemed a positive quality rating, and thus the credit level for the respective responder may be increased in one or both of the categories in this example. Conversely, in the case of a negative quality rating, the credit level for the respective responder may be decreased in one or both of the categories in this example. The assigned quality ratings for the responders may be sent to the computing device 102 for processing by the information sharing manager 104 in response to the requester selecting "Send" button 414. Subsequent to receipt of the quality ratings, the information sharing manager 104 may adjust the respective credits levels of the responders based on the quality ratings. Further, the information sharing manager 104 may control the computing device 102 to send an indication of the quality ratings and credit level change to respective responders.

In accordance with embodiments of the present disclosure, advertisers, companies, individuals, or other sponsors may associate with responders for providing their content to be included with requests. For example, financial services company or restaurant may sponsor or provide compensation to a requester in exchange for the requester to include marketing content from the company or restaurant in a response. Example marketing content includes an image of a logo or name of the company or restaurant, or a link to a website for the company or restaurant. A company or other entity may want to associate with the responder in the case of, for example, the responder having a high credit level in one or more categories. As an example, a financial services company may want to compensate a responder who rates highly in the "Financial Services" category for content placement of the company along with responses from the responder. Further, the company or other entity may instruct the responder to only place the content when the requester responds to a particular category or categories. In this way and other described herein, the company or other entity may target content only to those requesters who may be interested in the company or entity's services or products.

In an example, content from a company or other entity for inclusion with a response may be presented to the requester in any suitable way. For example, a company logo may be placed near the response when displayed to the requester. In the example of FIG. 4, the content may be placed within one of the boxes 402, 404, or 406 or adjacent the boxes. The information sharing manager 104 may manage inclusion of content with a response, and send a response to a requester computing device along with the content for presentation to the requester.

Compensation of a responder for placement of content in a request may be suitably made after placement with a response. For example, the information sharing manager 104 may arrange for payment after sending a response. Alternatively, payment for content placement may be made through a suitable service, such as PayPal, or any other suitable service for payment of content placement as will be understood by those of skill in the art.

Figure 5:
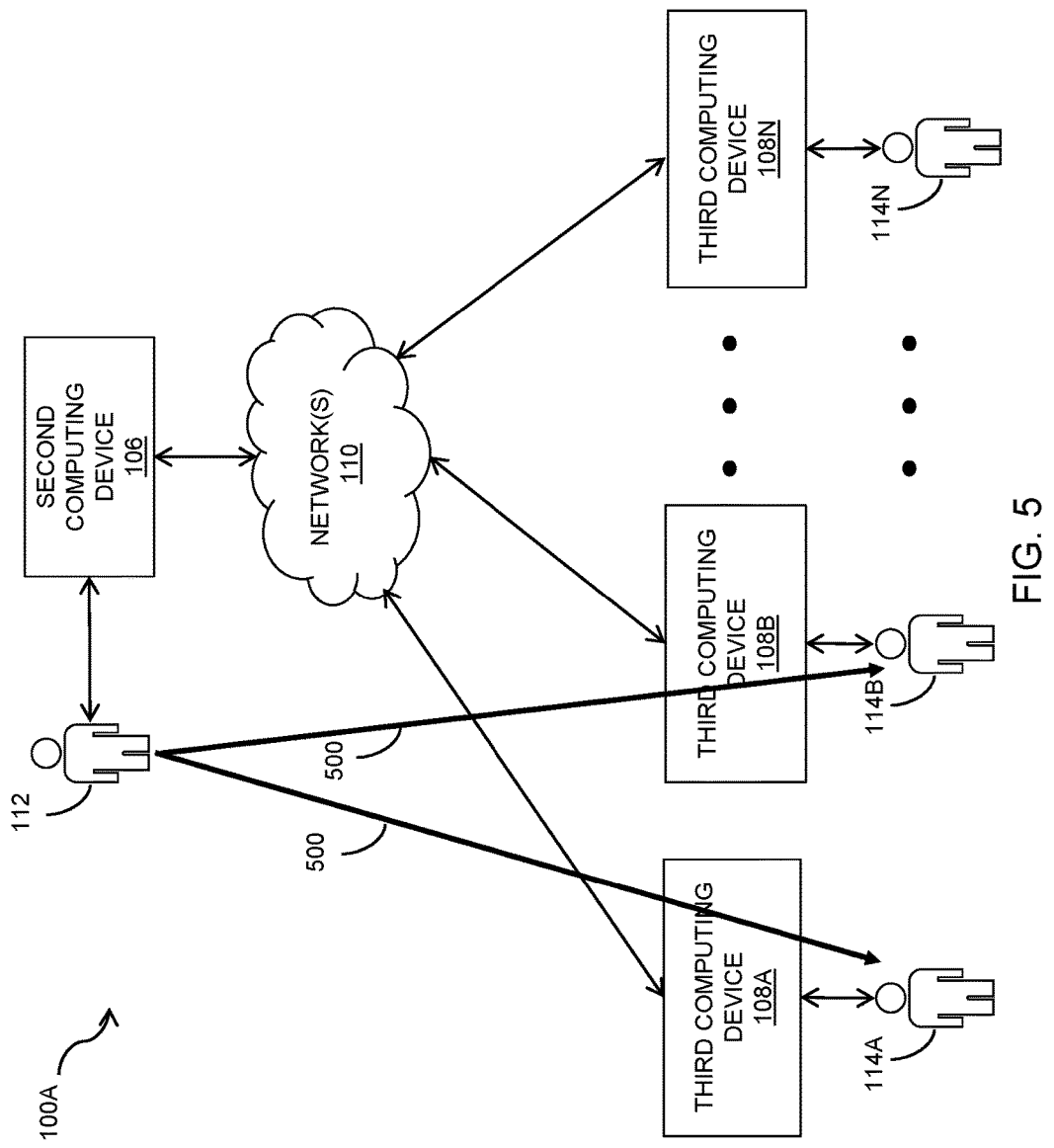
FIG. 5 is a schematic diagram of the system shown in FIG. 1 along with pathways that are generated in accordance with embodiments of the present disclosure.

In accordance with embodiments of the present disclosure, systems and methods disclosed herein may facilitate the networking and exchange of knowledge, information, and expertise of users, both requesters and responders. The connection of knowledge, information, and expertise of users by systems and methods disclosed herein may be viewed as an artificial neural network. Each user may be represented as a "neuron" in the network and pathways between nodes are facilitated by computing devices and communications network(s), such as in the system shown in FIG. 1. A pathway between one neuron and one or more other neurons may be created when a request is initiated. For example, a requester may communicate a request identifying one or more categories, and the request may be communicated to one or more prospective responders based on the request. This creates an initial pathway. For example, FIG. 5 illustrates the system shown in FIG. 1 along with pathways that are generated in accordance with embodiments of the present disclosure. In one example, the user 112 enters and send a request using the second computing device 106 to generate pathways 500 to prospective responders 114A and 114B via their computing devices 108A and 108B, respectively. Pathways 500 are generated based on the request generated by user 112. More specifically for example, the pathways 500 can be generated based on the categories identified in the request, the credit levels of prospective responders 114A and 114B in the categories, and/or other criteria described herein for determining which prospective responders for receipt of a request. Pathway generation between a requester and one or more responders is dynamic, because the system may facilitate communication between any users of the system; however, the request can limit the users who are determined to receive the request.

Pathway generation to a prospective responder can depend on previous responses by the responder. For example, if the responder increases his or her credit level in a particular category, subsequent pathways to the responder may be more likely to be generated. Thus, the responder can improve his or her access to requesters by improving his or her responses (i.e., providing timely and quality responses). In this way, pathways in the artificial network of users can be strengthened (made more likely when a request is made) or weakened (made less likely when a request is made) based on the quality and timeliness of responses. Thereby, efficiency in exchange and communication of knowledge, expertise, and information directly between users is improved as more users participate and provide responses to requests for their knowledge, expertise, and information.

The information sharing manager 104 may maintain and manage a database indicating credit levels (or scores) and achievement level group information for each user 114A-114N. For each user, there may be a different credit level associated different categories and geographic locations. The higher the credit level for a user in a category, the higher the user is ranked in that category among other users. Conversely, the lower the credit level for a user in a category, the lower the user is ranked in that category among other users. Further, a user may be ranked based on a timeliness of response, a quality of response, the like, and combinations thereof.

TABLE 1

| User ID | Category Type | Credit Level | Achievement Level Group |
|---|---|---|---|
| User 00001 | Food Services | 250 | Brown |
|  | Small Town | 550 | Black |
| User 00002 | Food Services | 150 | Green |
|  | Mid-Size Town | 75 | White |
| User 00003 | American History | 675 | Black |
| User 00004 | Computer Technology | 925 | Black |

The first computing device 102 may adjust a credit level of the third user 114 associated with the determined third computing device 108 of the third computing devices 108A-108N based on a received response. The credit level of users, such as the third users 114A-114N, may indicate one or more credits earned by the users. In Table 1 for example, User 00001 and User 00002 have credit levels of 250 and 150, respectively, in the "Food Services" category. Thus, User 00001 has a credit level higher than User 00002 in this category. A response from User 00001 in this category will rank higher than a response from User 00002. The credits may be reward points assigned to the users based on one or more factors or response credentials associated with the response. Examples of the response credentials may include such as, but not limiting to, correctness of the response, usefulness of the response, a time taken for sending the response, and so forth. The first computing device 102 may store and maintain response credentials for each of the computing devices such as, for example, the second computing device 106 and the third computing devices 108A-108N shown in FIG.

Further, in an exemplary scenario, the credits may be exchanged from one user to another for buying goods or services. The credits may be assigned to the users by the information sharing manager 104 and or by the other user, such as the second user receiving the response from the third users 114A-114N, to transfer the third users 114A-114N for responding to the requests of the second user 112. The credits may encourage the third users 114A-114N to actively respond in the future too as the credits may be used by the third users 114A-114N for availing services or requesting information from other users connected to the network 110 and/or to the information sharing manager 104.

The first computing device 102 may be configured to communicate the response to the second computing device 106. The second computing device 106 may be configured to assign a rating to the response based on a correctness of the response, a time taken for responding to the request for information, responsiveness to the request for information, and so forth. The first computing device may receive a quality rating from the second computing device 106 and may adjust the credit level of the one or more of the third users 114A-114N associated with the one or more third computing devices 108A-108N. In some embodiments, the first computing device 102 determines an adjustment of a credit level associated with the second user 112 of the second computing device 106. In such embodiments, the credit level associated with the one or more of the third users 114A-114N may be adjusted based on the adjustment of the credit level associated with the second user 112.

Further, the first computing device 102 may be configured to assign a ranking of each of the third users 114A-114N based on one or more communication response credentials. A ranking of a user may be where a responding user, such as a third user 114A, ranks among other responding users such as the third users 114A-114N. The third users 114A-114N may be assigned a ranking based on the response credentials. In an example scenario, the users may be given a ranking ranging within 1-10 based on a response time taken by the users. In an example of ranking of the third user (or other third users 114A-114N), a weighted sum model (WSM) may be used for determining a score (or credit level) for each of some or all users (or third users 114A-114N). The users may be ranked based on their score. For example, a user may be ranked higher than another user if the user's credit level (or score) is higher than the other user. Conversely, a user may be ranked lower than another user if the user's credit level (or score) is lower than the other user. Herein, ranking may be referred as rating due to similarity in their meaning with reference to disclosed embodiments. Examples of the response credentials may include such as, but are not limited to, a correctness of responses received from the third users 114A-114N, a time taken for responding to the request for information by the third users 114A-114N, availability of the users 114A-114N, responsiveness to a communication by the third users 114A-114N, and ranking of the each of the third users 114A-114N and the responses given by other users such as the second user 112. Further, the first computing device 102 may be configured to store and maintain a ranking associated with the users (i.e. the second user 112, and the third users 114A-114N) associated with the computing devices such as the second computing device 106 and the third computing devices 108A-108N) connected to the network 110.

In accordance with embodiments of the present disclosure, a suitable model may be applied for determining communication pathways among users in a system, such as the system shown in FIG. 1. As discussed herein, the system may be represented by an artificial neural network with users being neuron and the computing devices and communications network(s) of the system providing pathways between participating users. Pathways may be generated or strengthened, for example, based on credit levels assigned to prospective responders. A pathway from a requester to a prospective responder may be more likely to be generated when, for example, the prospective responder is assigned a high credit level in one or more categories, particularly categories identified in a request. Thus, pathways can be dynamic due to their dependence upon credit levels, which are dynamic.

A suitable equation or formula may be applied for determining a credit level or score of a user. The equation for determining a credit level for a user in a particular category may include one or more variables that correspond to a timeliness of a response to requests in the category, a quality of responses to requests in the category, and other criteria disclosed herein. An example equation follows for determining a credit level (or score) CL of a user in a particular category:

$$CL = \sum_{j=1}^{n} w_j c_{ij}, \text{ for } i = 1, 2, 3, \ldots, m.$$

In this equation, $w_j$ represents a relative weight of importance for criterion $c_{ij}$. For example, a weight for one criterion for determining the credit level CL may be higher than the weight of others. Thus, criterion with a higher weight can be assumed to be more important. Different weights may be applied to different criterion. There are m alternatives and n decision criteria in this equation. Furthermore, it is assumed that all the criteria are benefit criteria, that is, the higher the values are, the better it is. Also suppose that $w_j$ denotes the relative weight of importance of the criterion $c_j$, and $a_{ij}$ is the performance value of alternative $A_i$ when it is evaluated in terms of criterion $c_j$. Then, the total (i.e., when all the criteria are considered simultaneously) credit level CL is defined by the equation. This is one example for determining a credit level for a user in a particular category, and it should be appreciated that any suitable equation or model may be utilized for determining the credit level.

In some examples, a requester may control the criteria for selecting recipients for a request in any suitable manner. For example, the requester may require a response within a predetermined time period. In this example, such a request may only be sent to responders indicating that they can respond within the time period. In another example, the request may be limited to receipt by prospective responders who have a particular credit level in a selected category. In another example, the request may be limited to receipt by prospective responders who are within a selected geographic location (e.g., local to the requester). In another example, the request may be limited to receipt by prospective responders with whom the requester has previously communicated. In this example, the requester may suitably identify the prospective responder in the request such that the request is sent to a set of responders including the prospective responder.

In some embodiments, the responses of the third users 114A-114N and the second user 112 may be published in the network 110 based on a permission or preference of the third users 114A-114N, and the second user 112, respectively. Corresponding requests may also be published with the responses. Published responses may be readily available to the other users connected to the network 110 for viewing. In an example, such responses and requests may be made available via a website, application available for a smartphone, and/or the like as will be understood to those of skill in the art. Published requests and responses may be suitably indexed for search according to category, particular responder or requester, assigned quality of response, and the like associated with the request or response. In addition, sponsored content may be published along with published requests and responses. The users associated with the requests and responses may be compensated for permitting publication as will be understood.

In some embodiments, third users 114A-114N or the associated third computing devices 108A-108N may be divided into multiple groups based on factors, such as, but not limiting to, interests, age, location, activeness in responding, ranking, educational background and user preference. In some embodiments, the first computing device 102 may form the group or alternatively, the third users 114A-114B may form the groups. Such groups may be referred as a "network resource group." The network resource group may be a group of users acting as a single entity to respond to requests. For example, a company may form a network resource group for responding to request for information received. In such embodiments, when the request for information is received in the group of the third users 114A-114N then one or more users of this group can respond to the request. Further, when a request for information is received, all the members of the group may work together to send a response or may be a first user in the group or the designated user of the group may respond to the request for information.

Figure 6:
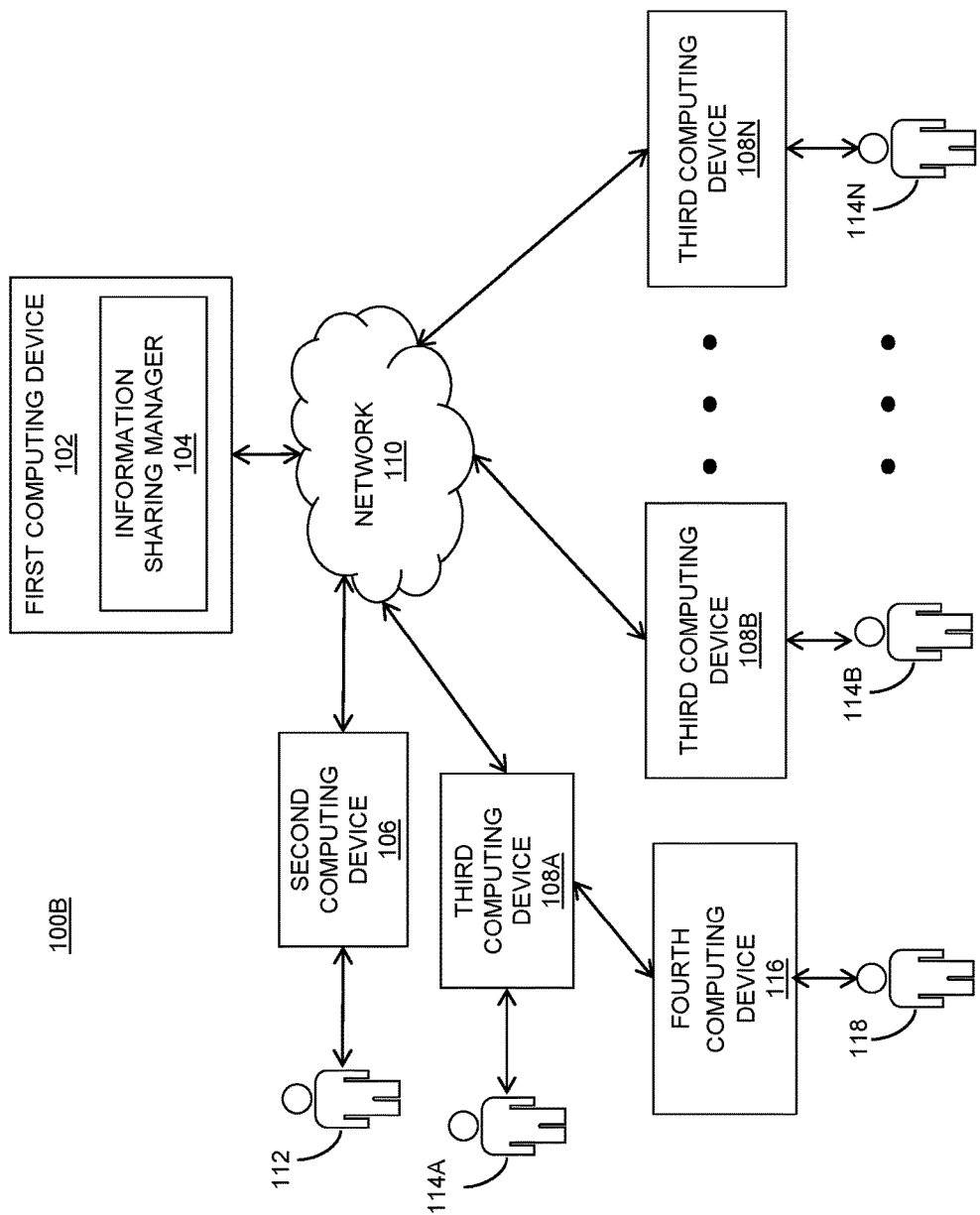
FIG. 6 is a schematic diagram of another example system within which various components may function in accordance with embodiments of the present disclosure.

FIG. 6 is a schematic diagram of another example system 100A within which various components may function in accordance with embodiments of the present disclosure. As shown, the system 100B includes a number of computing devices, such as the first computing device 102, the second computing device 106 associated with the second user 112, the third computing devices 108A-108N associated with the third users 114A-114N, and a fourth computing device 116 associated with a fourth user 118. The computing devices 102, 106, and 108A-108N, and the fourth computing device 116 are capable of communicating with each other via the network 110. As discussed with reference to FIG. 1, the first computing device 102 may be any computation device or a server capable of connecting with the network 110 and communicating with other devices, such as the second computing device 106 and the third computing devices 108A-108N, connected to the network 110. Examples of the fourth computing device 116 may include, such as, but are not limited to, a mobile phone, a desktop computer, a laptop computer, a smart phone, a personal digital assistant (PDA), a tablet computer, a smart television, a television, and so forth.

As discussed with reference to FIG. 1, the first computing device 102 may include the information sharing manager 104. The first computing device 102 may receive a request for information from the second computing device 106. In some embodiments, the request for information may include a query. The first computing device 102 may be configured to analyze the request for information and determine one or more of the third computing devices 108A-108N based on the analysis. The first computing device 102 may be configured to communicate or forward the request for information to the determined one or more or the third computing devices 108A-108N. The one or more of the third computing devices 108A-108N may receive the request for processing and may further communicate the request for information to the fourth computing device 116. The fourth computing device 116 may generate a response for the request for information based on analysis of the request for information and based on an input from the fourth user 118. In some embodiments, the fourth user 118 may enter the response at the fourth computing device 116. The fourth computing device 116 may send the response and additional content to the one or more of the third computing devices 108. The additional content may include a timestamp, an advertisement, a suggestion, a quiz, and so forth. The one or more of the third computing devices 108A-108N may forward the response and the content received from the fourth computing device 116. The first computing device 102 may be configured to receive the response corresponding to the request for information from the determined one or more of the third computing devices 108A-108N. The first computing device 102 may adjust a credit level of the third user of the third user 114A-114N associated with the one or more of the third computing devices 108A-108N based on the received response. The credit level may be adjusted by assigning (or deleting) one or more credits to the one or more of the third computing devices 108A-108N The credit level of a user, such as the third users 114A-114N, may indicate a number of credits earned by the user. The credits may be reward points assigned to the user based on one or more factors or response credentials associated with the response. The credits may be used by the user, such as the third user 114A, for exchanging information in future. Examples of the response credentials may include such as, but not limited to, correctness of the response, usefulness of the response, a time taken for sending the response, and so forth. The first computing device 102 may store and maintain response credentials for each of the computing devices, such as the second computing device 106, the fourth computing device 116, the third computing devices 108A-108N, and so forth.

Further, in an exemplary scenario, the credits may be equivalent to money in a monetary system; the users for buying goods or services from other users may use the credits. The credits may be assigned to the users by the information sharing manager 104 and or by the other user, such as the second user receiving the response from the third users 114A-114N, to compensate the third users 114A-114N for responding to the requests of the second user 112. The credits may encourage the third users 114A-114N to actively respond in future too as the credits may be used by the third users 114A-114N for availing services or requesting information from other users connected to the network 110 and/or to the information sharing manager 104.

The first computing device 102 may be configured to communicate the response and the content to the second computing device 106. The second computing device 106 may be configured to assign a rating to the response based on a correctness of the response, a time taken for responding to the request for information, responsiveness to the request for information, and so forth. The first computing device may receive the rating from the second computing device 106 and may adjust the credit level of the one or more of the third users 114A-114N associated with the one or more third computing devices 108A-108N. In some embodiments, the first computing device 102 may determine an adjustment of a credit level associated with the second user 112 of the second computing device 106. In such embodiments, the credit level associated with the one or more of the third users 114A-114N may be adjusted based on the adjustment of the credit level associated with the second user 112.

The first computing device 102 may also be configured to receive a feedback to the response and the content from the second computing device 106. The feedback may be forwarded to the one or more of the third computing devices 108A-108N, which in turn may forward the response to the fourth computing device 116. The feedback may include such as, but not limited to, a rating of the response and an acknowledgement of viewing of content on the second computing device 106. The first computing device 102 may also be configured to receive a credit for one or more of the third users 114A-114N associated with the third computing devices 108A-108N based on the received feedback. In some embodiments, the content includes an advertisement including an image, a text, a video, a hashtag, and an audio, provided by the fourth computing device 116.

Further, in some embodiments, the first computing device 102 may be configured to assign a ranking of each of the third users 114A-114N based on one or more communication response credentials. Examples of the communication response credentials may include such as, but are not limited to, a correctness of responses received from the third users 114A-114N, a time taken for responding to the request for information by the third users 114A-114N, availability of the users 114A-114N, responsiveness to a communication by the third users 114A-114N, and ranking of the each of the third users 114A-114N and the responses given by other users such as the second user 112. Further, the first computing device 102 may be configured to store and maintain a ranking associated with the users (i.e. the second user 112, and the third users 114A-114N) associated with the computing devices such as the second computing device 106 and the third computing devices 108A-108N) connected to the network 110. In an exemplary scenario of ranking of the third user (or other third users 114A-114N), a weighted sum model (WSM) may be used for determining a score for each of some or all users (or third users 114A-114N). The users may be ranked based on their score. For example, a user may be ranked higher than another user if the user's score is higher than the other user. Conversely, a user may be ranked lower than another user if the user's score is lower than the other user.

In some embodiments, the information sharing manager 104 may be located within the first computing device 102 as shown in FIG. 1 or 6 for example, or may be located remotely on a network device (not shown) in the network 110. The network device may be connected to the network 110. In some embodiments, the network device may be registered with the network 110. Examples of the network device may include, such as, but not limited to, a computation device (for example a router, a modem, etc.) present in the network 110.

In some embodiments, the third users 114A-114N or the associated third computing devices 108A-108N may be divided into multiple groups based on factors, such as, but not limiting to, interests, age, location, activeness in responding, ranking, educational background and user preference. In some embodiments, the first computing device 102 may form the group or alternatively, the third users 114A-114B may form the groups. Such groups may be referred as network resource group. The network resource group may be a group of users acting as a single entity to respond to requests. For example, a company may form a network resource group for responding to request for information received. In such embodiments, when the request for information is received in the group of the third users 114A-114N, then one or more users of this group can respond to the request. Further, when a request for information is received, all the members of the group may work together to send a response or may be a first user in the group or the designated user of the group may respond to the request for information.

Further, the response and/or the content may be a sponsored content. The sponsored content may refer to a response or a content that is sponsored by a user or a company. For example, a user, such as the fourth user 118, may be sponsored by a company to provide responses that promote the company or advertisements from the company can be placed on the responses. The company then may provide credits to the fourth user 118 or may pay in form of money. In some embodiments, may sponsor the third computing device 108 and provide content to the third computing device 108 for sending to other devices such as the second computing device 106. In such scenario, the fourth user 118 may pay money or give credits to the third user 114. The users in the network 110 may be motivated to seek more credits as the credits may be exchanged with other users in order to gain more information, knowledge, and expertise of the other users.

In some embodiments, the third user 114 may hire another user such as the fourth user 118 for responding to all the request for information that are being directed to or picked based on the work claim requests by the third computing device 108. In some embodiments, third computing devices 108A-108N can select or pick a work claim request for responding to the request for information associated with the work claim request. The third user 114 may select the work claim request based on such as, his/her own interest, time availability, and so forth.

Figure 7:
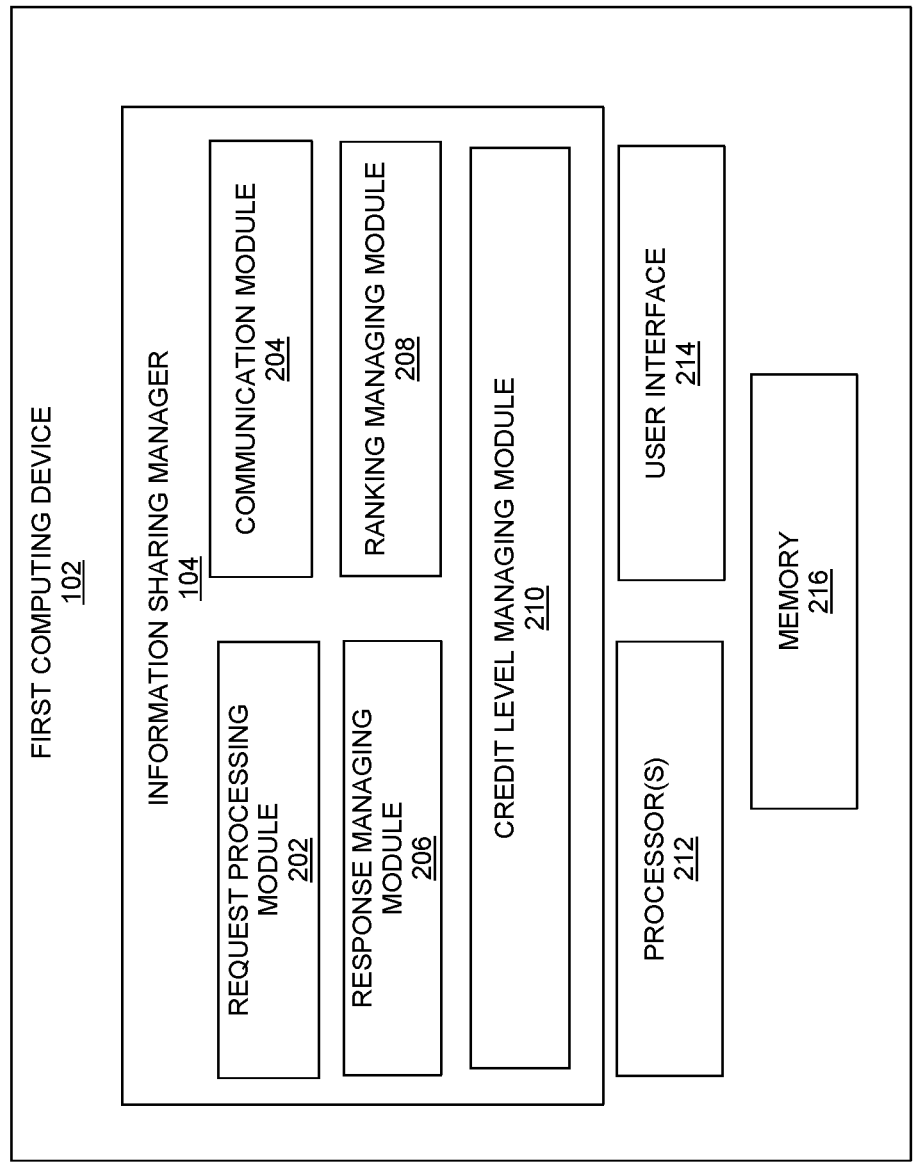
FIG. 7 is a block diagram of various system elements of an example first computing device in accordance with embodiments of the present disclosure.

FIG. 7 is a block diagram of various system elements of an example first computing device, such as the first computing device 102 of FIG. 1 or 6, for example, in accordance with embodiments of the present disclosure. As shown the first computing device 102 may include the information sharing manager 104, one or more processors 212, a user interface 214, and a memory 216. The information sharing manager 104 may further include a request processing module 202, a communication module 204, a response managing module 206, a ranking managing module 208, and a credit level managing module 210.

The processors 212 may further include one or more digital signal processors, central processing units, field programmable gate arrays, programmable array logic, programmable logic devices, cloud processing systems, or the like. The information sharing manager 104 may be a device or combination of multiple devices that may be implemented in software for execution by various types of the processors 212. The user interface 214 may enable a user such as a first user (not shown) of the first computing device 102 to interact with the first computing device 102.

As discussed with reference to FIGS. 1 and 6, the first computing device 102 may be configured to receive a request for information from the second computing device 106. The communication module 204 of the information sharing manager 104 may be configured to receive requests for information from the second computing device 106. The request processing module 202 may be configured to analyze the request for information, and determine at least one third computing device from the third devices 108A-108N based on the analysis of the request for information. Herein after, the determined at least one third computing device may be referred as the third computing device 108 without change in meaning. In some embodiments, the request processing module 202 determines the one or more of the third computing devices 108A-108N based on one or more determining factors such as, but not limited to, a geographic location of the second computing device 106 or/and of the one or more of the third computing devices 108A-108N, an interest of the third users 114A-114N, a rating of the third users 114A-114N or of the computing devices 108A-108N, educational background of the third users 114A-114N, a time when the request for information is received, and an availability of the on or more third users 114A-114N associated with the one or more of the third computing devices 108A-108N. For example, the server may forward the queries related to food to a chef or a nutritionist.

In some embodiments, the communication module 204 may further be configured to automatically communicate the request for information to the third computing device 108 based on the analysis of the request for information. In alternative embodiments, the communication module 204 may display a list including the determined one or more of the third computing devices 108A-108N on a display of the second computing device 106. Thereafter, the second user 112 can choose to whom he/she wants the request to be directed. Based on the choice or selection of the third computing devices 108A-108N by the second user 112 received from the second computing device 106, the first computing device may communicate the request for information to the selected third computing device of the third computing devices 108A-108N.

In some embodiments, the communication module 204 may be configured to associate a work claim ticket with the request for information and communicate the request for information to the third computing devices 108A-108N. The communication module 204 may be configured to receive a request for the work claim ticket from the third computing devices 108A-108N. The communication module 204 may be configured receive a response corresponding to the request for information from the third computing device 108. The communication module 204 may further be configured to communicate the response to the second computing device 106.

The communication module 204 may be further configured to receive a quality rating or ranking for the response from the second computing device 106. The second computing device 106 may assign the ranking or rating based on a response credentials including, but are not limited to, a correctness of response, and a time taken for responding to the request for information, a responsiveness to the request for information. In an exemplary scenario, the response is not correct or is not useful to the second user 112, then a negative, low or bad rating may be given to the third user 114 by the second user 112. Otherwise, when the second user 112 finds the response as correct and useful then the second user 112 may give a positive or good rating to the third user 114. In an example of ranking of the third user (or other third users 114A-114N), a weighted sum model (WSM) may be used for determining a score for each of some or all users (or third users 114A-114N). The users may be ranked based on their score. For example, a user may be ranked higher than another user if the user's score is higher than the other user. Conversely, a user may be ranked lower than another user if the user's score is lower than the other user.

In some embodiments, the communication module 204 may also be configured to receive a feedback to the response and the content from the second computing device 106. The feedback may be forwarded to the one or more of the third computing devices 108A-108N, which in turn may forward the response to the fourth computing device 116. The feedback may include such as, but not limited to, a rating of the response and an acknowledgement of viewing of content on the second computing device 106. The communication module 204 may also be configured to receive a credit for the third users 114A-114N associated with the third computing devices 108A-108N based on the received feedback from the fourth computing device 116 and/or the second computing device 106. In some embodiments, the content includes an advertisement including an image, a text, a video, a hashtag, and an audio, provided by the fourth computing device 116.

The credit level managing module 210 may be configured to adjust a credit level of the third user 114 associated with the third computing device 108 based on the received response. The credit level may indicate one or more credits earned by the third user 114. The third user 114 for exchanging information with other computing devices in future may use the earned credits. In some embodiments, the credit level managing module 210 is further configured to adjust the credit level of the third user 114 based on the rating for the response received from the second computing device 106.

In alternative embodiments, the credit level managing module 210 is further configured to determine an adjustment of a credit level associated with the second user 112. The credit level of the second user 112 may indicate one or more credits or reward points earned by the second user 112 by sharing information in the network 110. Further, the credit level managing module 210 may further be configured to adjust the credit level associated with the third user 114 based on the adjustment of the credit level associated with the second user 112. Further, in an exemplary scenario, the credits may be equivalent to money in a monetary system; the users for buying goods or services from other users may use the credits. The credits may be assigned to the users by the information sharing manager 104 and or by the other user, such as the second user receiving the response from the third users 114A-114N, to compensate the third users 114A-114N for responding to the requests of the second user 112. The credits may encourage the third users 114A-114N to actively respond in future too as the credits may be used by the third users 114A-114N for availing services or requesting information from other users connected to the network 110 and/or to the information sharing manager 104.

Further, the response managing module 206 may be configured to maintain response credentials for each of the first computing device, the second computing device 106, and the third computing devices 108A-108N. Examples of the response credentials may include responses, timestamp information of the responses, number of responses from each computing device, content received along with the responses, ranking of the responses or that of the users 114A-114N, and so forth.

The ranking managing module 208 may be configured to maintain a ranking of the users, such as the second user 112 and the third computing devices 108A-108N, based on a number of communication response credentials. In some embodiments the ranking managing module 208 may maintain a ranking for each of the computing devices such as, the second computing device 106 and the third computing devices 108A-108N. In some embodiments, the ranking managing device may be configured assign or adjust a ranking of the second user 112 and the third computing devices 108A-108N. In some embodiments, the ranking managing device may be configured assign or adjust a ranking or rating of the computing devices such as, the second computing device 106 and the third computing devices 108A-108N.

In some embodiments, the memory 216 may store the response credentials, rankings or ratings and credits of the users and the third computing devices 108A-108N and second computing device 106, device identifier associated with the computing devices 106, and 114A-114N, and so forth.

Figure 8:
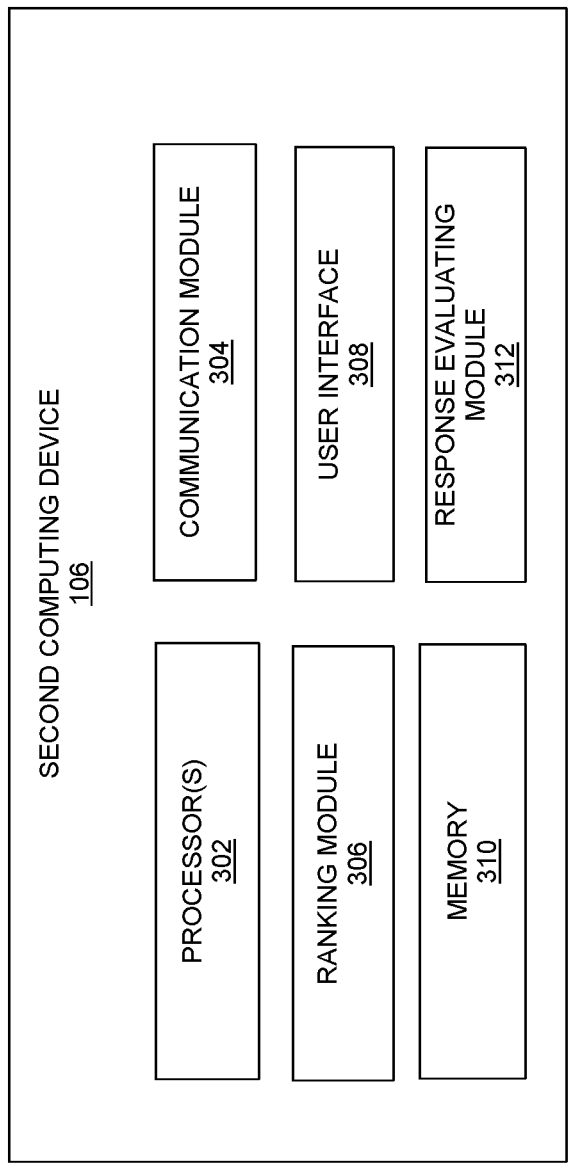
FIG. 8 is a block diagram of various system elements of an exemplary second computing device in accordance with embodiments of the present disclosure.

FIG. 8 illustrates a block diagram of various system elements of an exemplary second computing device, such as the second computing device 106 shown in FIGS. 1 and 6 for example, in accordance with embodiments of the present disclosure. Referring to FIG. 8, the second computing device 106 primarily includes one or more processors 302, a communication module 304, a ranking module 306, a user interface 308, a memory 310, and a response evaluating module 312. The processors 302 may be configured to execute or process one or instructions for allowing the other modules 304-312 to work with each other for information sharing. The instructions may be stored in the memory 310. The user interface 308 may be configured to allow the second user 112 to interact with the second computing device 106. The second user 112 may enter a request for information at the user interface 308 on a display of the second computing device 106.

The communication module 304 may be configured to send the request for information to the first computing device 102, such as a server. The communication module 304 may also be configured to receive a response and/or content for the request for information from the first computing device 102 or other devices in the network 110.

The response evaluating module 312 may be configured to evaluate the responses based on the multiple response credentials including, but are not limited to, a correctness of response, and a time taken for responding to the request for information, a responsiveness to the request for information. Based on the evaluation, the ranking module may be configured to assign a rating or ranking to the computing device such as the third computing device 108 or its associated third user 114. The communication module 204 may be further configured to send the rating or ranking for the response to the second computing device 106. In an exemplary scenario, the response is not correct or is not useful to the second user 112, and then a negative, low or bad rating may be given to the third user 114 by the second user 112. Otherwise, when the second user 112 finds the response as correct and useful then the second user 112 may give a positive or good rating to the third user 114 and in turn the ranking module may assign the rating to the third user 114. The ranking module 306 may be configured to store the rating of various third users 114A-114N.

In some embodiments, the communication module 304 may also be configured to send a feedback to the response and/or the content to the first computing device 102. In some embodiments, the memory 310 may also store the responses and the content received by the communication module 304.

Figure 9:
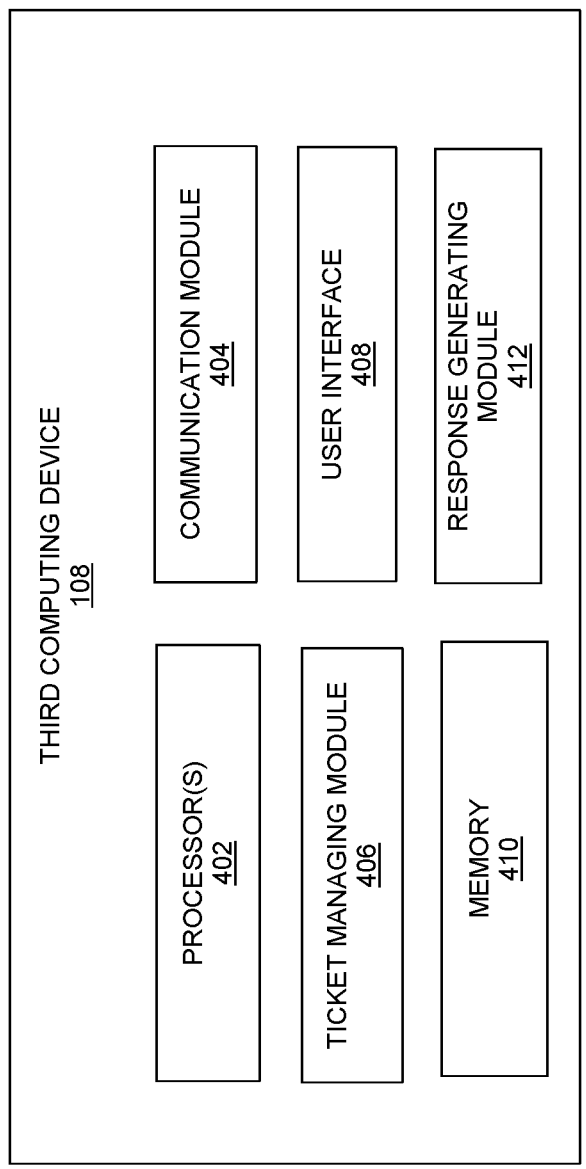
FIG. 9 is a block diagram of various system elements of an example third computing device, such as the third computing device shown in FIG. 1, in accordance with embodiments of the present disclosure.

FIG. 9 illustrates a block diagram of various system elements of an example third computing device, such as the third computing device 108, in accordance with embodiments of the present disclosure. Referring to FIG. 9, the third computing device 108 primarily includes one or more processors 402, a communication module 404, a ticket managing module 406, a user interface 408, a memory 410, and a response generating module 412. The processors 402 may be configured to process or execute one or instructions for allowing the other modules 404-412 to work with each other. The instructions may be stored in the memory 410. The user interface 408 may be configured to allow the third users 114A-114N to interact with the third computing devices 108A-108N.

The third users 114A-114N may also select or pick a number of work claim ticket(s) associated with the requests for information from the first computing device 102. The ticket managing module 406 may be configured to manage and process one or more work claim tickets selected by the third user 114 of the third computing device 108. The response generating module 412 may be configured to generate a response corresponding to the request for information based on an analysis of the request for information and an input from the third user 114 at the user interface 408.

In some embodiments, the communication module 404 may be configured to forward the request to another device such as the fourth computing device 116 and receive a response and/or content from the fourth computing device 116. The communication module 404 may communicate the response and/or content to the first computing device 102.

In some embodiments, the third user 114 may hire another user such as the fourth user 118 for responding to all or some of the request for information that are being directed to or picked based on the work claim requests by the third computing device 108. In some embodiments, third computing devices 108A-108N can select or pick a work claim request for responding to the request for information associated with the work claim request. The third user 114 may select the work claim request based on factors such as, his/her own interest, time availability, and so forth.

Figure 10:
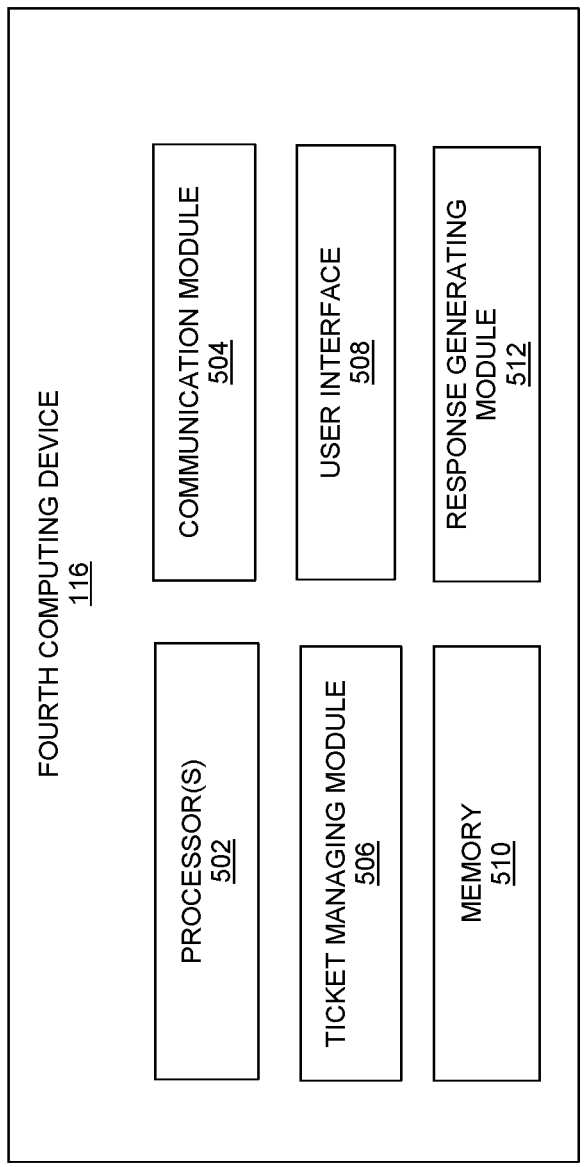
FIG. 10 is a block diagram of various system elements of an example fourth computing device, such as the fourth computing device of FIG. 6, in accordance with embodiments of the present disclosure.

FIG. 10 illustrates a block diagram of various system elements of an example fourth computing device, such as the fourth computing device 116 of FIG. 6, in accordance with embodiments of the present disclosure. The fourth computing device 116 may primarily include one or more processors 502, a communication module 504, a ticket managing module 506, a user interface 508, a memory 510, and a response generating module 512. The processors are configured to one or instructions for allowing the other modules to work with each other. The instructions may be stored in the memory 510. The user interface 508 may be configured to allow the fourth user 118 to interact with the fourth computing device 116. The second user 112 may enter one or more input at the user interface 508 on a display of the fourth computing device 116.

As discussed with reference to FIG. 4, the third users 114A-114N may also select or pick a number of work claim ticket(s) associated with the requests for information from the first computing device 108. In some embodiments, the third computing device 108A-108N may be configured to forward the work claim ticket and/or the request for information to the fourth computing device 116. The communication module 504 maybe configured to receive the work claim ticket and/or the request for information. Further, the ticket managing module 506 may be configured to manage and process one or more work claim tickets selected by the third user 114 of the third computing device 108.

The response generating module 512 may be configured to generate a response corresponding to the request for information based on an analysis and processing of the request for information and an input from the fourth user 118 at the user interface 508. In some embodiments, the communication module 504 may be configured to send or transmit the response and/or content from to the third computing device 108. In alternative embodiments, the communication module 504 may further communicate the response and/or content to the first computing device 102 or other devices in the network 110.

Figure 11A:
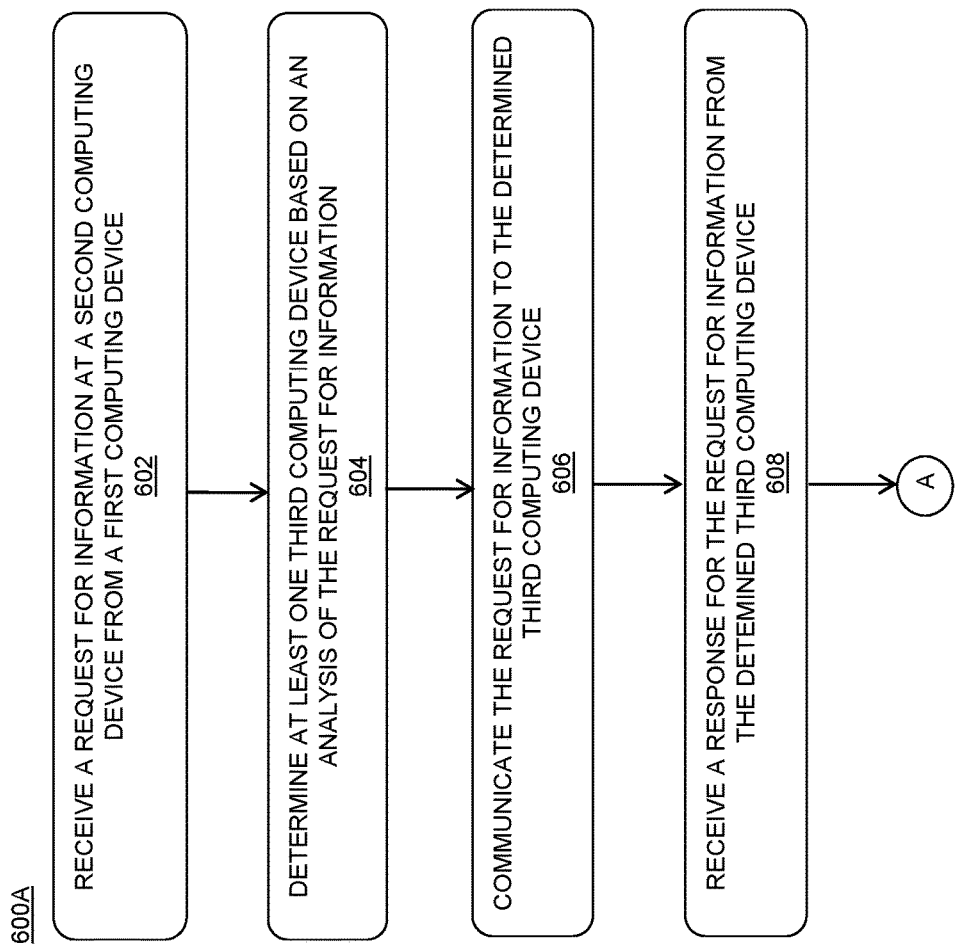

FIGS. 11A and 11B illustrate a flowchart of an example method 600A-600B for facilitating information and expertise distribution via a communications network in accordance with embodiments of the present disclosure. As discussed with reference to FIG. 1 for example, the first computing device 102 includes the information sharing manager being configured to enable sharing or exchange of information among multiple computing devices i.e. the second computing device 106 and the third computing devices 108A-108N. As further discussed with reference to FIG. 2, the first computing device 102 includes the one or more processors 212, the user interface 214 and the memory 216. The information sharing manager 104 includes the request processing module 202, the communication module 204, the response managing module 206, the ranking managing module 208, and the credit level managing module 210. The first computing device 102 may be configured to receive multiple request for information from the second computing device 106 and forward the requests to the third computing devices 108A-108N based on a determination as discussed in FIG. 2.

At step 602, a request for information is received at the first computing device 102 from the second computing device 106. In an exemplary scenario, the first computing device 102 can be a server located remotely, and the second computing device 106 can be a smart phone of the second user 112. The second user 112 may enter a request for best colleges in New Delhi pin code 110060 at the user interface of the smartphone. Then, the request may be sent to the server via the network 110. In some embodiments, the communication module 204 may receive the request for information from the communication module 304 of the second computing device 106.

At step 604, the first computing device may analyze the request for information and may determine at least one of the third computing devices 108A-108N base don factors already discussed above, such as, geographic location of the third users 114A-114N or the third computing devices 108A-108N. In some embodiments, the request processing module 206 may determine the at least one third computing device (hereinafter referred as third computing device 108). Thereafter, at step 606, the request for information is communicated to the third computing device 108. In some embodiments, the communication module 204 sends the request for information to the third computing device 108. The communication module 404 may receive the request for information from the first computing device 102. The request may be processed at the third computing device 108 by the response generating module 412 for generating a response.

Then, at step 608, a response corresponding to the request for information is received from the third computing device 108. The communication module 204 may receive the response (and/or content) from the third computing device 108. Then, at step 610, a credit level of a user, such as the third user 114, associated with the third computing device 108 is adjusted based on the received response. In some embodiments, the credit level managing module 210 may adjust the credits of the third user 114. The credit level of the third user 114 may indicate one or more credits or reward points earned by the third user 114 by responding to the request for information.

At step 612, the received response may be communicated to the second computing device 106. In some embodiments, the communication module 204 may communicate the response to the second computing device 106. The second computing device 106 may evaluate the response and assign a rating to the user 114 or the third computing device 108 based on the evaluation. Then at step 614, the first computing device 102 may receive the rating or the ranking for the response from the second computing device 106. For example, the second computing device 106 may assign the ranking like 1 to 10, where 1 being highest and 10 being lowest or vice versa to the third computing device 108. Thereafter, at step 616, a credit level of the third user based on the received rating or the ranking. In some embodiments, the credit level managing module 210 adjusts or assigns the credit level of the third user 114.

Figure 12A:
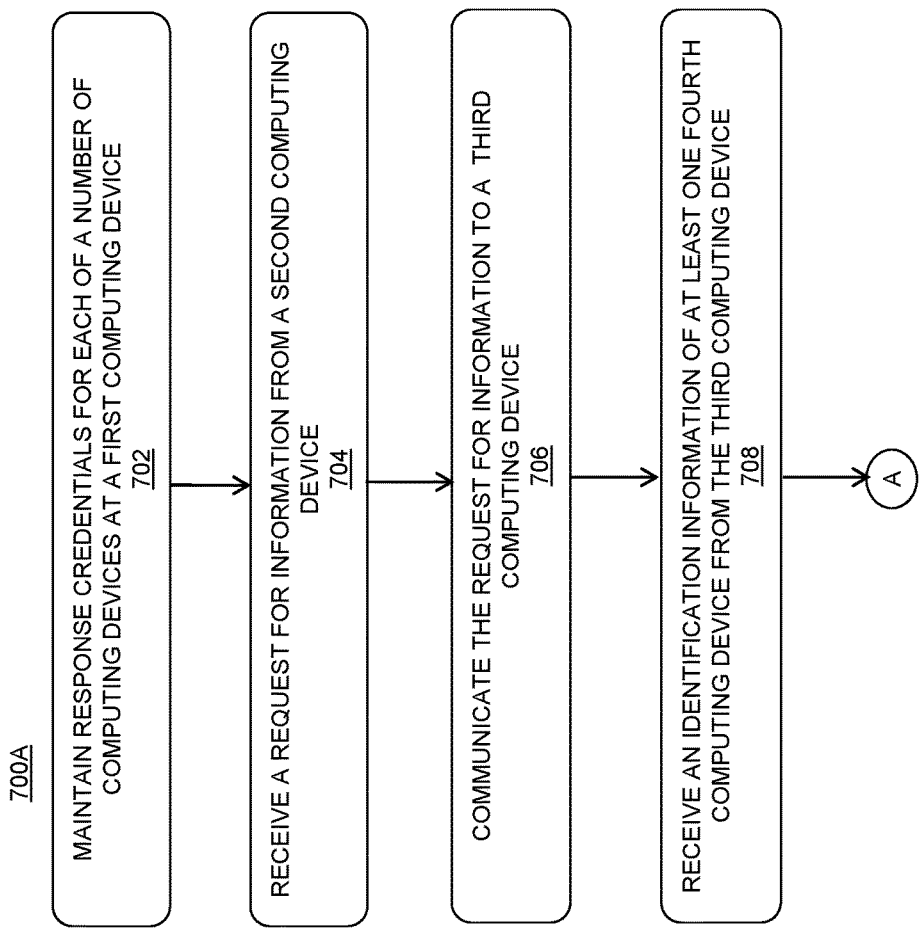
Figure 12C:
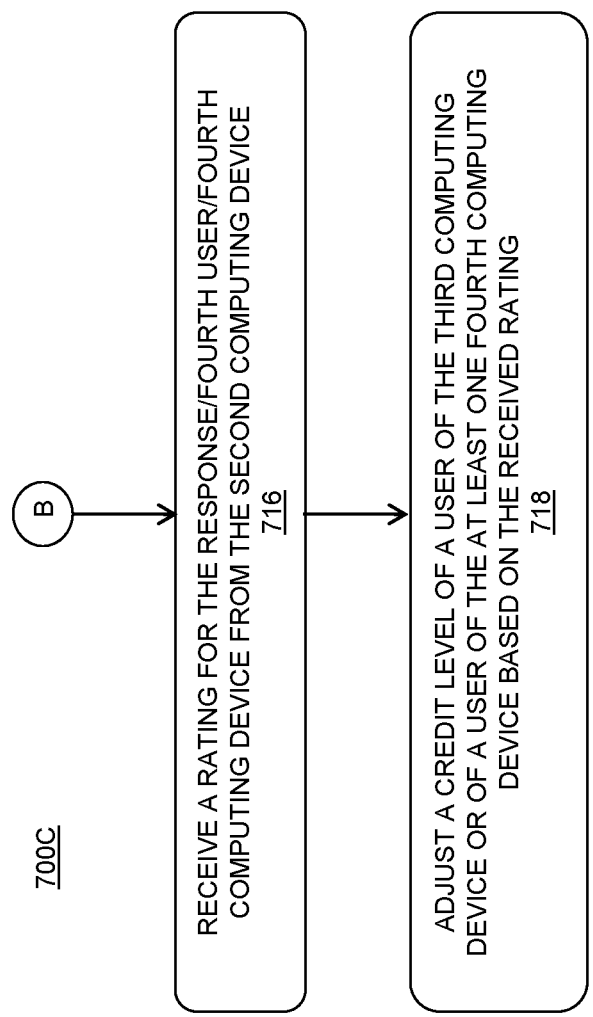

FIGS. 12A-12C illustrate a flowchart of an example method 700A-700C for finding a computing device for directing a request for information based on an analysis of the request for information in a network, in accordance with an embodiment of the present disclosure. As discussed with reference to FIG. 1, the first computing device 102 includes the information sharing manager being configured to enable sharing or exchange of information among multiple computing devices i.e. the second computing device 106 and the third computing devices 108A-108N. As further discussed herein, the first computing device 102 includes the one or more processors 212, the user interface 214 and the memory 216. The information sharing manager 104 includes the request processing module 202, the communication module 204, the response managing module 206, the ranking managing module 208, and the credit level managing module 210. The first computing device 102 may be configured to receive multiple request for information from the second computing device and forward the requests to the third computing devices 108A-108N based on a determination as discussed in FIG. 2. Based on an analysis of the request for information the first computing device 102 may determine one or more third computing devices of the third computing devices 108A-108N.

At step 702, response credentials for each of a number of computing devices such as, the second computing device 106, and the third computing devices 108A-108N, are maintained or stored. In some embodiments, the response managing module 206 maintains the response credentials. Examples of the response credentials may include, but are not limited to, correctness of the response, usefulness of the response, a time taken for sending the response, and so forth. The first computing device 102 may store and maintain response credentials for each of the computing devices i.e. the second computing device 106, the third computing devices 108A-108N, and so forth.

At step 704, a request for information is received from the second computing device 106. In some embodiments, the request for information is received at the communication module 204 of the first computing device 102. The request processing module 202 may process the request and determine one or more of the third computing device 108A-108N for communicating the request. At step 706, the request for information may be communicated to the determined third computing device 108. In some embodiments, the communication module 204 may be configured to communicate the request for information to the determined third computing device 108.

At step 708, the communication module 204 may receive an identification information of the fourth computing device 116 from the third computing device 108. In some embodiments, the third computing device 108 may hire the fourth user 118 or the fourth computing device 116 for responding to the requests on behalf of the third computing device 108. Then at step 710, the request for information may be communicated to the fourth computing device 116 by the communication module 204.

At step 712, the communication module 204 may receive a response along with content, for example an advertisement, from the fourth computing device 116. At step 714, the communication module 204 may communicate the response along with the content to the second computing device 106. Further, the second computing device 106 may assign a rating or ranking for the response by evaluating the response based on one or more response credentials. The response evaluating module 312 may evaluate the response at the second computing device 106. The rating may be sent to the first computing device 102 by the communication module 304 of the second computing device 106.

Thereafter, at step 716 the communication module 204 receives the rating or ranking for the response or the fourth user 118 or the fourth computing device 116 from the second computing device 106. Then at step 718, the credit level managing module 210 may adjust a credit level of the fourth user 118 associated with the fourth computing device 116 based on the received rating or ranking. Throughout the description the terms ranking and the rating are being used interchangeably as they refer to same meaning. In an example of ranking of the third user (or other third users 114A-114N), a weighted sum model (WSM) may be used for determining a score for each of some or all users (or third users 114A-114N). The users may be ranked based on their score. For example, a user may be ranked higher than another user if the user's score is higher than the other user. Conversely, a user may be ranked lower than another user if the user's score is lower than the other user.

Figure 13A:
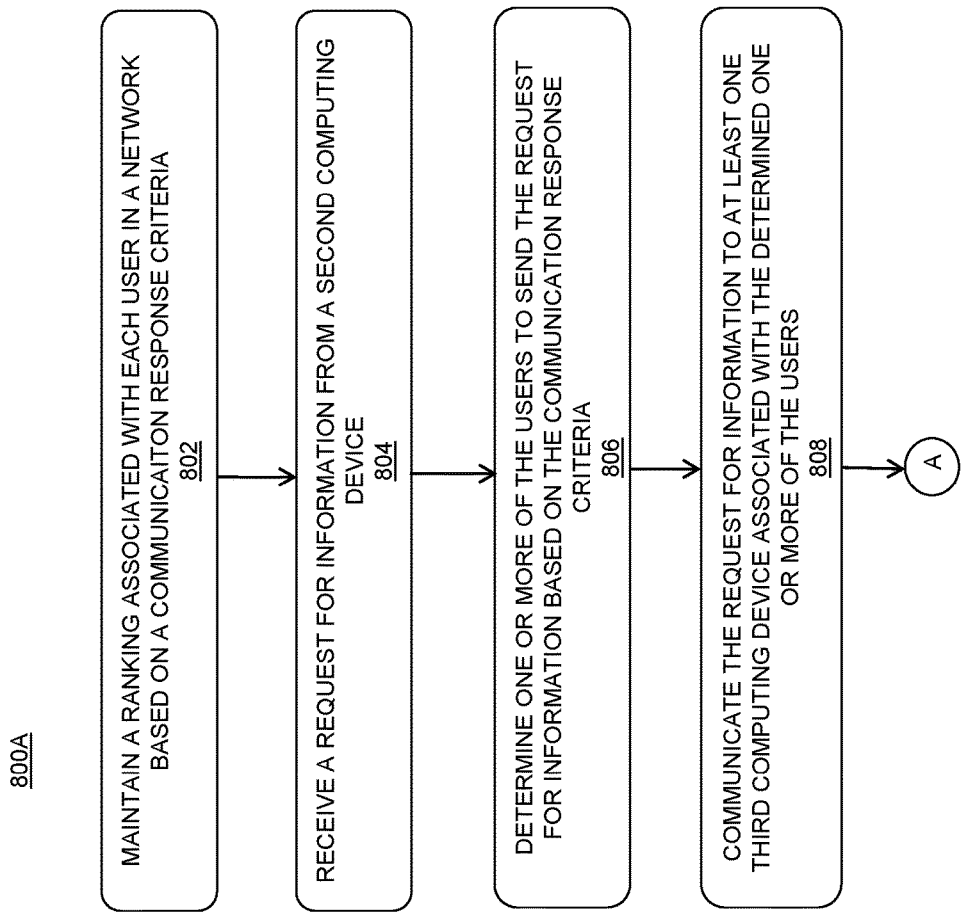
FIGS. 13A-13B illustrate a flowchart of another example method for finding a computing device for directing a request for information to the computing device based on an analysis of the request for information in a network in accordance with embodiments of the present disclosure.
Figure 13B:
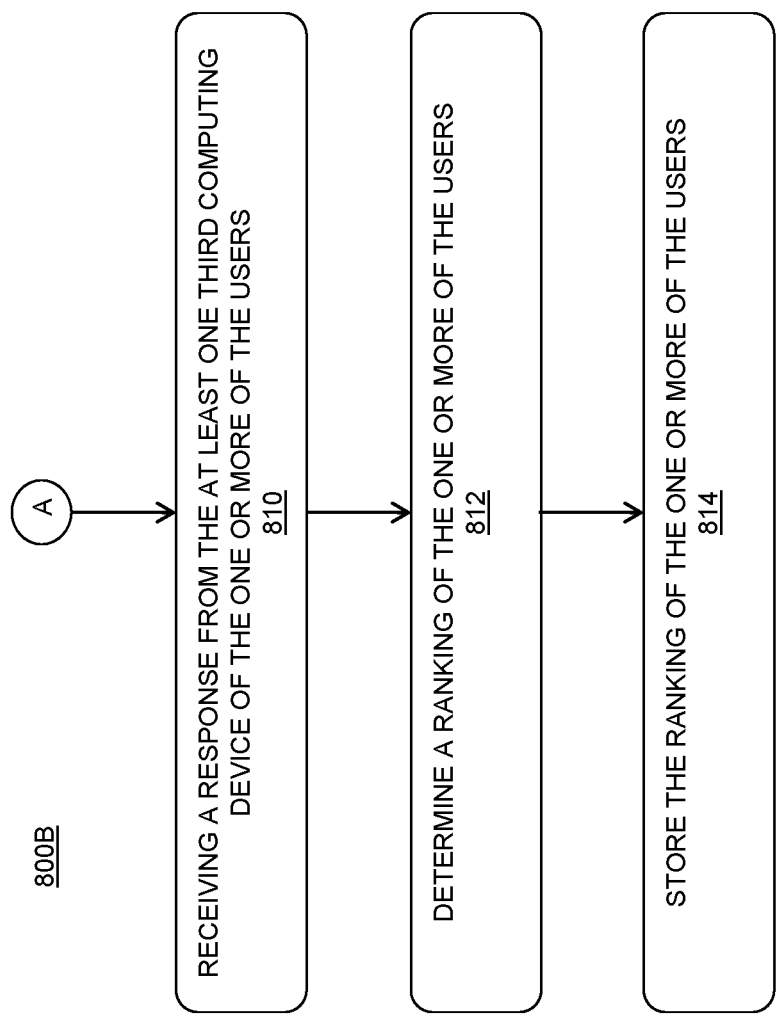

FIGS. 13A-13B illustrate a flowchart of another example method 800A-800B for finding a computing device (such as the third computing device 108) for directing a request for information to the computing device based on an analysis of the request for information in a network such as the network 110, in accordance with embodiments of the present disclosure. As discussed with reference to FIG. 1, the first computing device 102 includes the information sharing manager being configured to enable sharing or exchange of information among multiple computing devices i.e. the second computing device 106 and the third computing devices 108A-108N. As further discussed with reference to FIG. 2, the first computing device 102 includes the one or more processors 212, the user interface 214 and the memory 216. The information sharing manager 104 includes the request processing module 202, the communication module 204, the response managing module 206, the ranking managing module 208, and the credit level managing module 210. The first computing device 102 may be configured to receive multiple request for information from the second computing device and forward the requests to the third computing devices 108A-108N based on a determination as discussed in FIG. 2. Based on an analysis of the request for information the first computing device 102 may determine one or more third computing devices of the third computing devices 108A-108N.

At step 802, ranking associated with each of the users such as the second user 112, third users 114A-114N, and the fourth user 118 are maintained or stored. The ranking is based on a number of communication response credentials as discussed above. In some embodiments, the ranking managing module 208 maintains the ranking credentials. The ranking may be within a range of 1-10, where 1 being the best and 10 being worst or vice versa. Examples of the response credentials may include, but are not limited to, correctness of the response, usefulness of the response, a time taken for sending the response, and so forth. The first computing device 102 may store and maintain response credentials for each of the computing devices i.e. the second computing device 106, the third computing devices 108A-108N, and ranking of the users, and so forth. In an example of ranking of the third user (or other third users 114A-114N), a weighted sum model (WSM) may be used for determining a score for each of some or all users (or third users 114A-114N). The users may be ranked based on their score. For example, a user may be ranked higher than another user if the user's score is higher than the other user. Conversely, a user may be ranked lower than another user if the user's score is lower than the other user.

At step 804, a request for information is received from the second computing device 106. In some embodiments, the request for information is received by the communication module 204 of the first computing device 102. At step 806, the request processing module 202 may process the request and determine one or more of the third users 114A-114N for communicating the request. Hereinafter, the determined one or more of the third users 114A-114N may be referred as the determined third user 114. At step 808, the request for information may be communicated to the third computing device 108 associated with the determined third user 114. In some embodiments, the communication module 204 may be configured to communicate the request for information to the third computing device 108 associated with the determined third user 114.

At step 810, the communication module 204 may receive a response and/or content, for example an advertisement, from the third computing device 108 of the determined third user 114. At step 812, the ranking managing module 208 may determine a ranking for the user (or one or more users 114A-114N responding to the request for information) based on an analysis of the response.

Thereafter, at step 814, the ranking managing module 208 may store the ranking of the user 114 (or the one or more users 114A-114N).

Figure 14A:
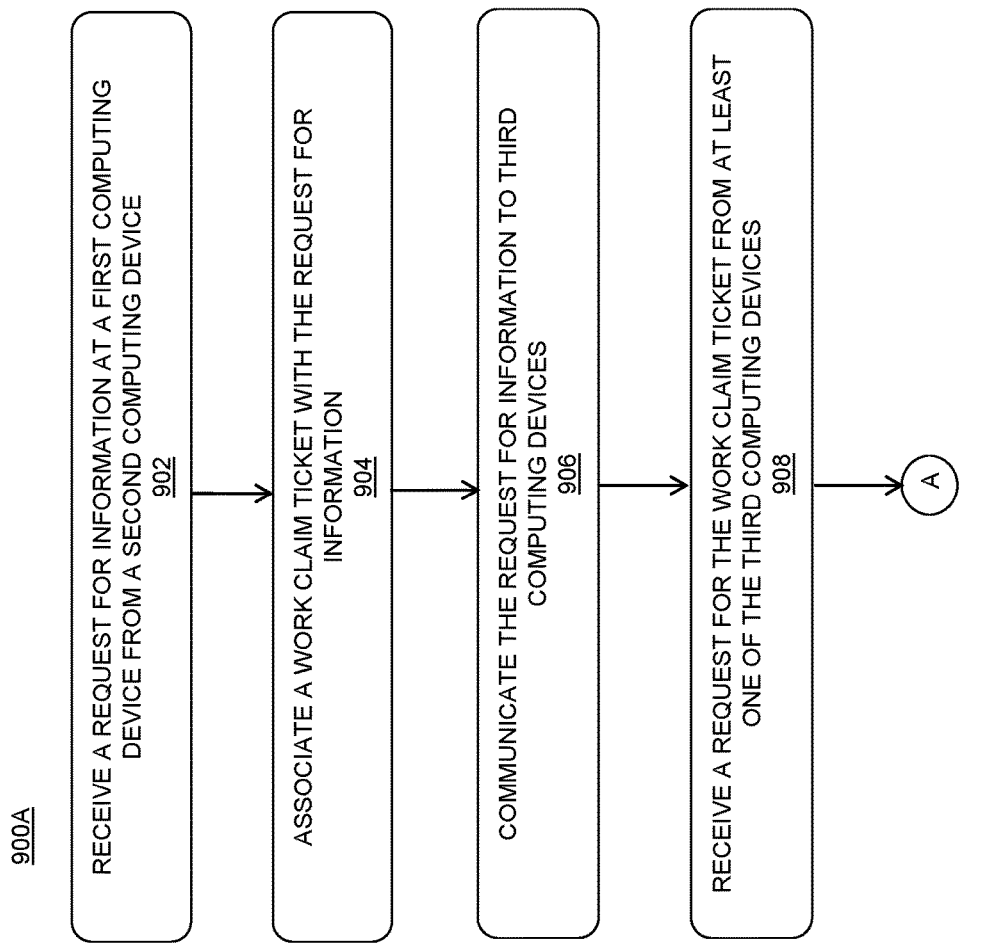
FIGS. 14A and 14B illustrate a flowchart of another example method for sharing information in a network in accordance with embodiments of the present disclosure.
Figure 14B:
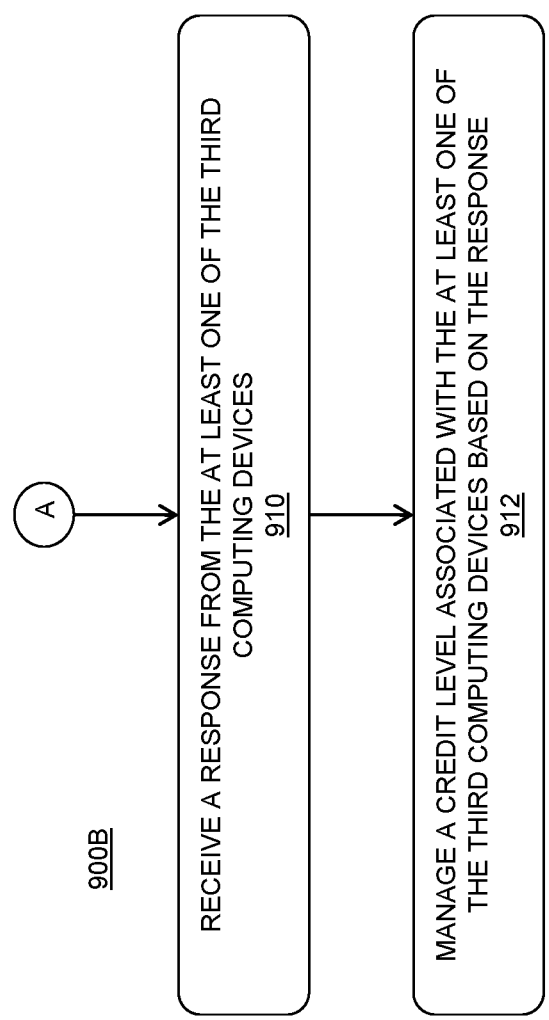

FIGS. 14A and 14B illustrate a flowchart of another example method 900A-900B for sharing information in a network, such as the network 110, in accordance with embodiments of the present disclosure. As discussed with reference to FIG. 1, the first computing device 102 may receive a number of requests from the second computing device 106 and is configured to forward the request for information to the one or more of the third computing devices 108A-108N in the network 110.

At step 902, the communication module 204 receives a request from the second computing device 106. The request for information may include a query. Then at step 904, the request processing module 202 may associate a work claim ticket with the request for information. The work claim ticket may include an identifier of the request for information, and so forth. Then at step 906, the request for information may be communicated to the third computing devices 108A-108N determined based on the analysis of the request for information by the request processing module 202. The communication module 204 may communicate the request for information to the third computing devices 108A-108N.

At step 908, the communication module 204 may receive a request for the work claim ticket from at least one third computing device 108 of the third computing devices 108A-108N. Then at step 910, the communication module 204 may receive a response from the at least one third computing device 108. Thereafter, the credit level managing module 210 may manage or adjust a credit level associated with the at least one third computing device 108 based on the received response.

Figure 15A:
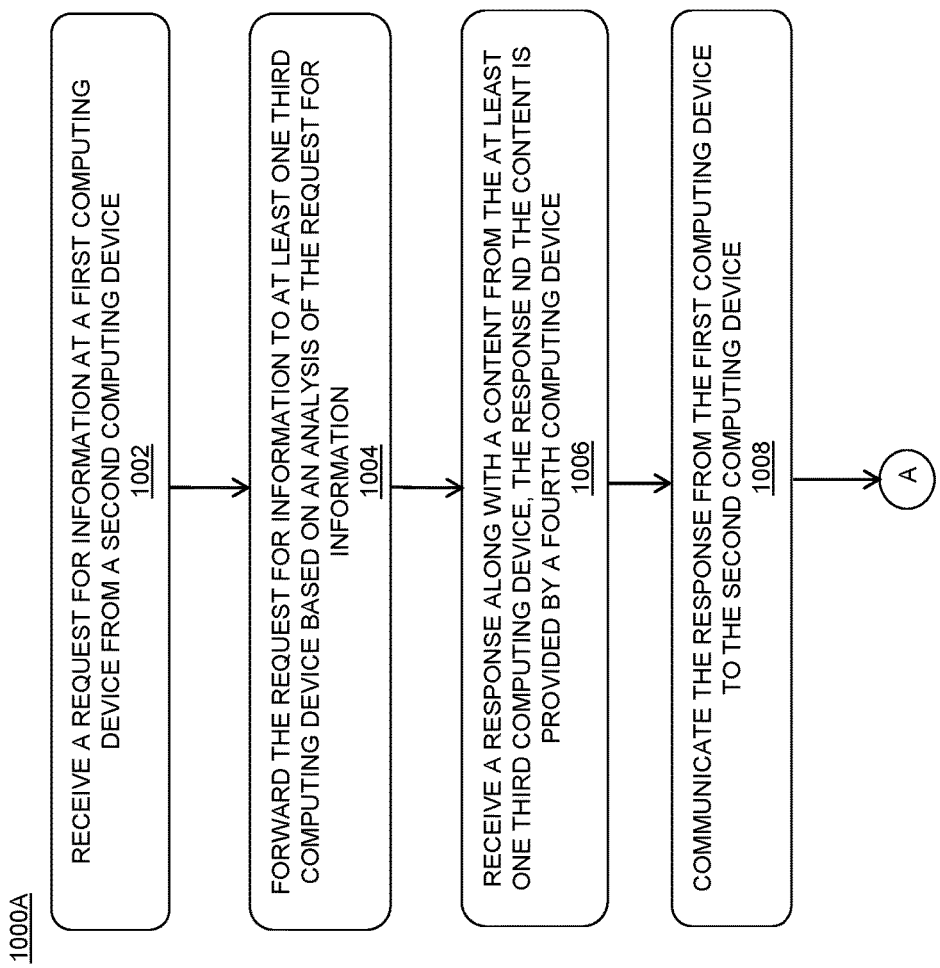
FIGS. 15A and 15B illustrate a flowchart of another example method for enabling sharing of information among multiple computing devices in a network, in accordance with embodiments of the present disclosure.
Figure 15B:
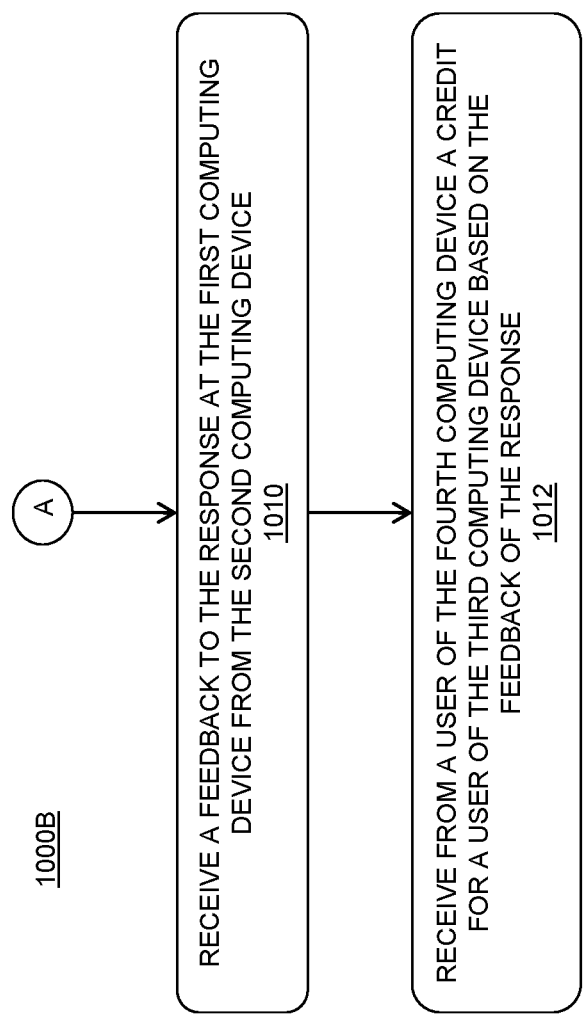

FIGS. 15A and 15B illustrate a flowchart of another example method 1000A-1000B for enabling sharing of information among multiple computing devices in a network in accordance with embodiments of the present disclosure. As discussed with reference to FIG. 1, the first computing device 102 may receive a number of requests from the second computing device 106 and is configured to forward the request for information to the one or more of the third computing devices 108A-108N in the network 110.

At step 1002, the communication module 204 of the first computing device 102 receives a request from the second computing device 106. The request for information may include a query. In an exemplary scenario, the first computing device 102 can be a server located remotely, and the second computing device 106 can be a smart phone of the second user 112. The second user 112 may enter a request for best restaurants serving Lebanese cuisine in Greece at the user interface of the smartphone. Then, the request may be sent to the server via the network 110.

At step 1004, the request for information may be forwarded to at least one third computing device 108 determined based on an analysis of the request for information. In some embodiments, the request for information may be analyzed for determining the at least one third computing device 108 by the request processing module 202 and may be forwarded by the communication module 204. Then at step 1006, the communication module 204 from the determined third computing device 108 may receive a response along with content. The response and the content may be provided to the third computing device by the fourth computing device 116.

At step 1008, the communication module 204 communicates the response and the content to the second computing device 106. The second computing device may evaluate the response and provide a feedback about the response to the first computing device 102. At step 1010, the communication module 204 receives the feedback for the response from the second computing device 106. Thereafter, the first computing device 102 receives a credit for the third user 114 of the third computing device 108 based on the feedback of the response. The fourth user 118 may send the credit for the third user 114 based on the feedback of the response. The feedback may include a rating or ranking of the fourth computing device 116 or the associated fourth user 118.

Figure 16:
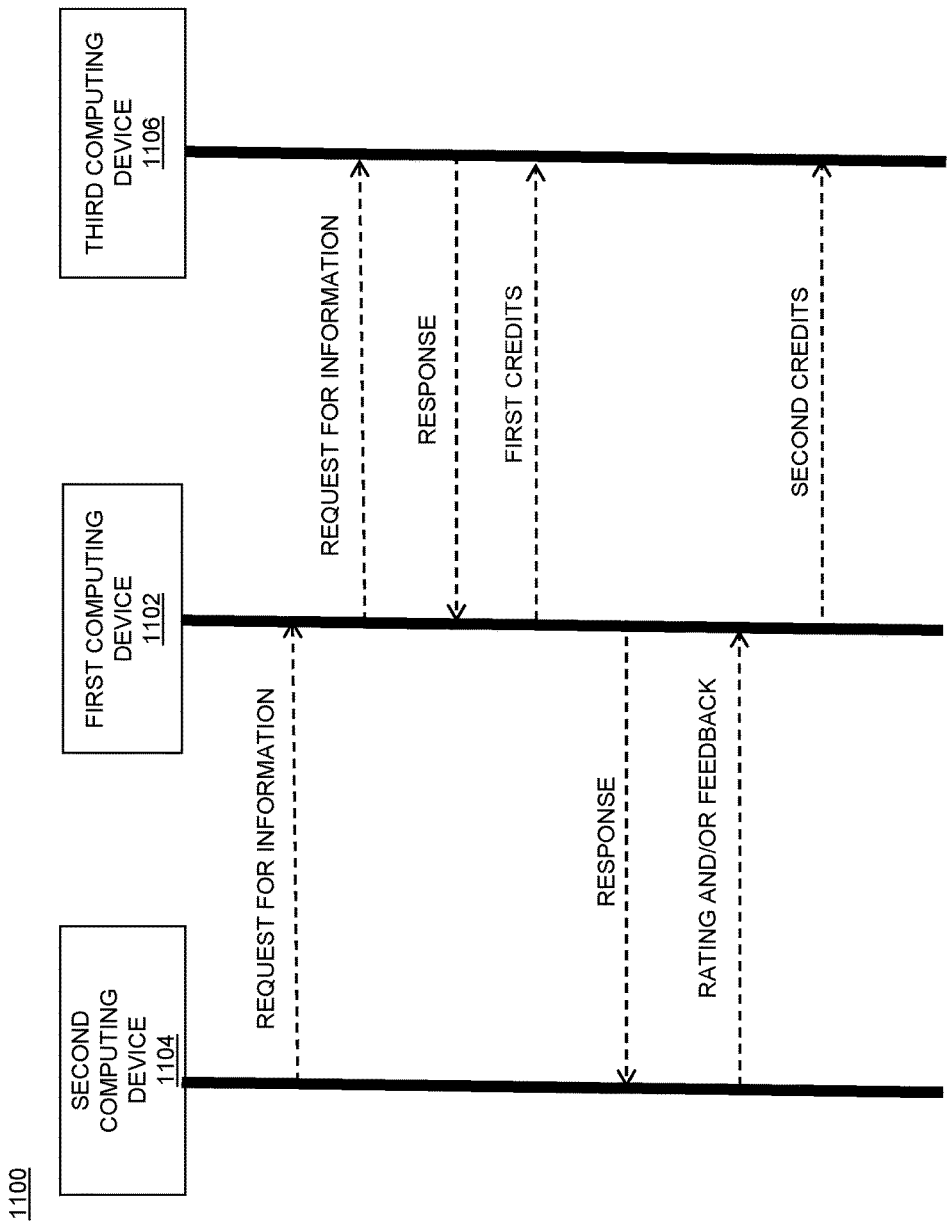
FIG. 16 is a message flow diagram 1100 illustrating flow of messages among a number of computing devices for sharing information in a network, in accordance with an embodiment of the present disclosure.

FIG. 16 is a message flow diagram 1100 illustrating flow of messages among a number of computing devices for sharing information in a network, in accordance with an embodiment of the present disclosure. As shown, a first computing device 1102 can receive a request for information from a second computing device 1104. The first computing device 1102 may analyze the request for information and determine a third computing device 1106 for forwarding the request for processing. The first computing device 1102 may then forward the request for information to the determined the third computing device 1106. In some embodiments, the third computing device 1106 may receive additional information such as a work claim ticket from the first computing device 1102. Here we have shown only one third computing device 1106, but a person skilled in the art will appreciate that the request for the information can be sent to multiple third computing devices 1106.

The third computing device 1106 can generate a response for the request for information based on one or more inputs from a third user of the third computing device 1106. The response is then sent to the first computing device 1102. The first computing device 1102 then may adjust a credit level of the third computing device 1106 based on the received response by giving first credits to the third computing device 1106.

Thereafter, the first computing device 1102 forwards the response to the second computing device 1104. The second computing device 1104 may evaluate the response and may provide a ranking/rating to the third user or the third computing device 1106. The second computing device 1104 may send a ranking/rating and/or a feedback of the response to the first computing device 1102. In an example of ranking of the third user (or other users), a weighted sum model (WSM) may be used for determining a score for each of some or all users. The users may be ranked based on their score. For example, a user may be ranked higher than another user if the user's score is higher than the other user. Conversely, a user may be ranked lower than another user if the user's score is lower than the other user. In some embodiments, the second computing device 1104 may determine the ranking based on one or more response credentials. Examples of the response credentials may include such as, but not limited to, correctness of the response, usefulness of the response, a time taken for sending the response, and so forth.

The first computing device 1102 may further adjust the credit level of the third computing device 1106 and/or of the third user by giving second credits to the third computing device 1106 based on the received ranking/rating and/or feedback from the second computing device 1104. In some embodiments, no credits may be given to the third computing device 1106, for example, when the response is evaluated as bad or have a negative or low ranking.

Figure 17:
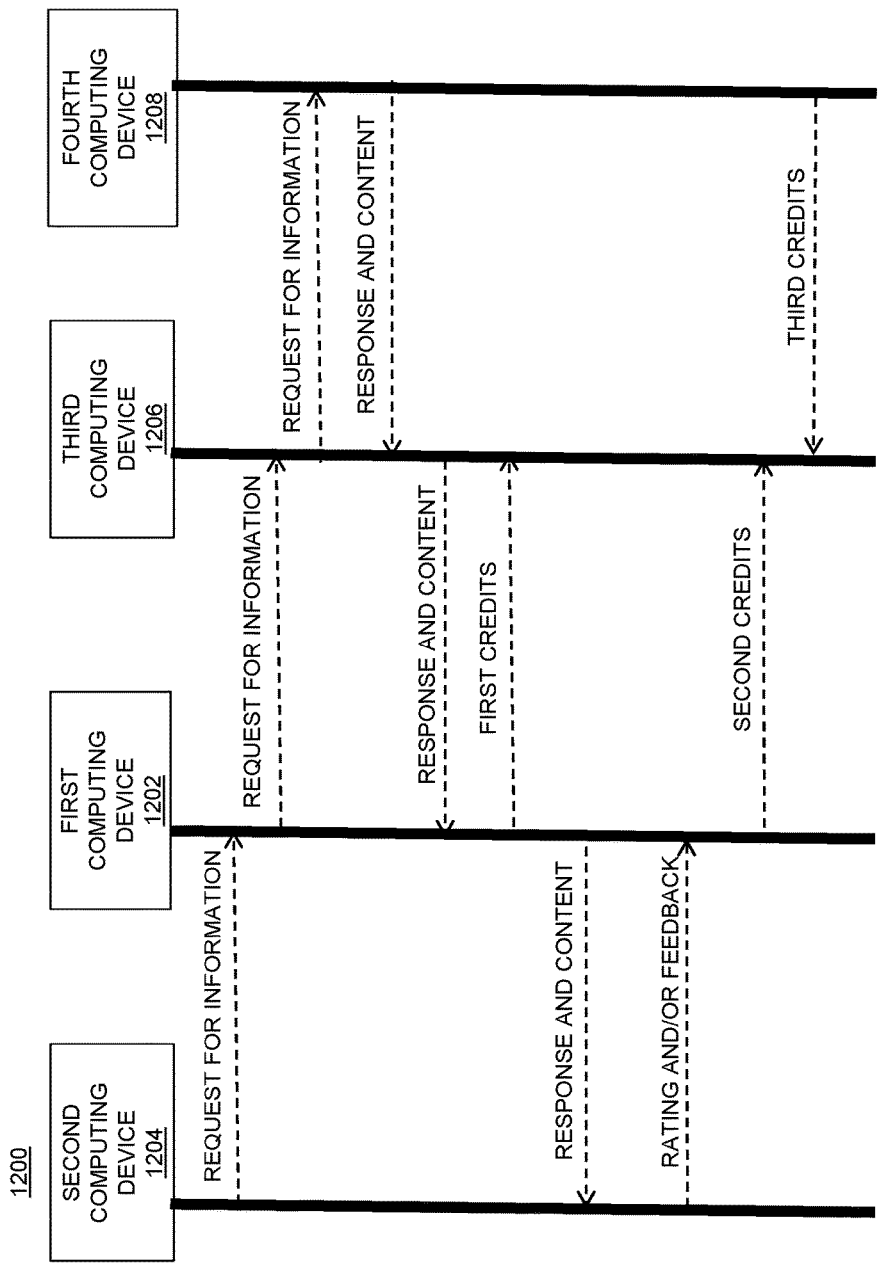
FIG. 17 is a message flow diagram illustrating flow of messages among multiple computing devices for sharing information in a network in accordance with another embodiment of the present disclosure.

FIG. 17 is a message flow diagram 1200 illustrating flow of messages among multiple computing devices for sharing information in a network in accordance with another embodiment of the present disclosure. As shown, a first computing device 1202 can receive a request for information from a second computing device 1204. The first computing device 1202 may analyze the request for information and determine a third computing device 1206 for forwarding the request for processing. The first computing device 1202 may then forward/communicate the request for information to the determined the third computing device 1206. FIG. 17 shows only one third computing device 1206, but a person skilled in the art will appreciate that the request for the information can be sent to multiple third computing devices 1206. In some embodiments, the third computing device 1206 may receive additional information such as a work claim ticket from the first computing device 1202.

As shown, the third computing device 1206 may forward the request for information to a fourth computing device 1208. The fourth computing device 1208 may generate a response for the request for information based on one or more inputs from a fourth user of the fourth computing device 1208. The response and/or content may be then sent to the third computing device 1206. The first computing device 1202 then may adjust a credit level of the third computing device 1206 based on the received response by giving first credits to the third computing device 1206.

Thereafter, the first computing device 1202 forwards the response and/or content to the second computing device 1204. The content may be an advertisement. The second computing device 1204 may review and evaluate the response and may provide a ranking/rating to the third user or the third computing device 1206. The second computing device 1204 may send a ranking/rating and/or a feedback of the response to the first computing device 1202. In an example of ranking of the third user (or other users), a weighted sum model (WSM) may be used for determining a score for each of some or all users. The users may be ranked based on their score. For example, a user may be ranked higher than another user if the user's score is higher than the other user. Conversely, a user may be ranked lower than another user if the user's score is lower than the other user. In some embodiments, the second computing device 1204 may determine the ranking based on one or more response credentials. Examples of the response credentials may include such as, but not limited to, correctness of the response, usefulness of the response, a time taken for sending the response, and so forth.

The first computing device 1202 may further adjust the credit level of the third computing device 1206 and/or of the third user by giving second credits to the third computing device 1206 based on the received ranking/rating and/or feedback from the second computing device 1204. In some embodiments, no credits may be given to the third computing device 1206, for example, when the response is evaluated as bad or have a negative or low ranking.

In some embodiments, the fourth computing device 1208 also give some credits such as third credits to the third computing device 1206. The third credits may be in form of money or other services from the fourth computing device 1208.

In accordance with embodiments of the present disclosure, users may be anonymous to each other. The computing device 102, for example, may store identifying information (e.g., name, email address, or phone number) for users but may prevent it from being distributed to others. Any type of identifying information may be limited to credit level information or ranking information as described herein.

Users may register with the system using any suitable technique. For example, a user may select a user name and password for registering and logging into the system. Other information, such as a name, mailing address, email address, billing information, or the like, may be provided when logging in. Suitable social networking services, such as FACEBOOK® social networking service, may be used for registering and logging into the system as will be understood by those of skill in the art. Such services may also be used for monitoring and controlling communications among users (e.g., requests and responses) to prevent or otherwise control harassments or offensive communications among users.

The various techniques described herein may be implemented with hardware or software or, where appropriate, with a combination of both. For example, the second computing device 106 shown in FIG. 1 may include suitable hardware, software, or combinations thereof configured to implement the various techniques described herein. The methods and apparatus of the disclosed embodiments, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the presently disclosed subject matter. In the case of program code execution on programmable computers, the computer will generally include a processor, a storage medium readable by the processor (including volatile and non-volatile memory and/or storage elements), at least one input device and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The described methods and apparatus may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the presently disclosed subject matter. When implemented on a general-purpose processor, the program code combines with the processor to provide a unique apparatus that operates to perform the processing of the presently disclosed subject matter.

While the embodiments have been described in connection with the preferred embodiments of the various figures, it is to be understood that other similar embodiments may be used or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed:

1. A method for sharing of information among a plurality of computing devices in a network, the method comprising:
   at a first computing device of the plurality of computing devices:
   receiving a request for information from a second computing device of the plurality of computing devices, wherein the request for information is user input at the second computing device;
   determining one or more other users to receive the request for information based on analysis of the request for information;
   communicating the request for information to one or more other computing devices associated with the determined one or more other users;
   receiving at least one response input by the determined one or more other users for responding to the request for information;
   adjusting at least one credit level of the one or more other users based on the received at least one response to the request for information, wherein the at least one credit level of the one or more other users indicates one or more credits earned by the one or more other users;
   communicating the at least one response to the second computing device for presentation to the user that input the request for information:
   managing weighted pathways for requesting information between computing devices associated with information requesters among the plurality of computing devices and computing devices of the one or more others users based on the at least one credit level and based on requests for information input by the information requesters and their associated computing devices;
   dynamically changing the weighted pathways based on the at least one credit level; and
   directing requests for information from the information requesters to the one or more others users via the computing devices based on the dynamically changed weighted pathways.

2. The method of claim 1, further comprising:
   receiving, from the second computing device, a rating for the at least one response based on at least one of a correctness of response, and a time taken for responding to the request for information, a responsiveness to the request for information; and
   adjusting the at least one credit level of the one or more users based on the rating received from the second computing device,
   wherein dynamically changing the weighted pathways comprises dynamically changing the weighted pathways based on the adjusted at least one credit level.

3. The method of claim 2, further comprising determining an adjustment of a credit level associated with a user among the one or more users, wherein the credit level associated with the user among the one or more users is adjusted based on the adjustment of the at least one credit level associated with the user among the one or more users.

4. The method of claim 3, further comprising determining the one or more other users to receive the request for information based on at least one of a geographic location of the at least one of the second computing device and the one or more other users, a time when the request for information is received, and an availability of the one or more other users.

5. The method of claim 1, wherein dynamically changing the weighted pathways comprises dynamically strengthening or weakening at least one of the weighted pathways based on the at least one credit level of the user.

6. The method of claim 1, wherein dynamically changing the weighted pathways comprises preventing the user from receiving another request based on the at least one credit level of the user.

7. The method of claim 1, wherein adjusting at least one credit level of the user comprises applying a weighted sum model that includes variables for credit level criteria and corresponding weight.

8. The method of claim 1, further comprising associating a work claim ticket with the request.

9. A method for ranking a plurality of users in a network, comprising:
   at a first computing device:
   maintaining a ranking associated with each of the plurality of users based on a plurality of communication response credentials, wherein the communication response credentials for each of the plurality of users indicates one or more credits earned by each of the users;
   receiving, from a second computing device, a communication including a request for information, wherein the request is user input at the second computing device;
   determining one or more of the plurality of users to send the request for information based on the communication response credentials;
   generating one or more weighted pathways between the second computing device and at least one third computing device associated with the one or more of the plurality of users, wherein the weighted pathways are weighted based on the communication response credentials;
   communicating the request for information to the at least one third computing device associated with the one or more of the plurality of users;
   adjusting at least one credit level of the one or more other users based on the received at least one response to the request for information;
   managing the weighted pathways for requesting information between computing devices associated with information requesters among the plurality of computing devices and computing devices of the one or more others users based on the at least one credit level and based on requests for information input by the information requesters and their associated computing devices;
   dynamically changing the one or more weighted pathways based on the communication response credentials; and
   directing requests for information to the at least one third computing device based on the dynamically changes weighted pathways.

10. The method of claim 9, further comprising determining the ranking of each of the plurality of users based on at least one of a correctness of responses received from the plurality of users, a time taken for responding to the request for information by the plurality of users, availability of the plurality of users, responsiveness to a communication by the plurality of users, and ranking of the each of the plurality of users given by other users of the plurality of users, and wherein dynamically changing the one or more weighted pathways comprises dynamically changing the one or more weighted pathways based on the ranking of each of the plurality of users.

11. The method of claim 9, wherein dynamically changing the one or more weighted pathways comprises dynamically strengthening or weakening the one or more weighted pathways based on the communication response credentials.

12. The method of claim 9, wherein dynamically changing the one or more weighted pathways comprises preventing the second computing device from receiving another request based on the communication response credentials.

13. The method of claim 9, wherein maintaining the ranking comprises applying a weighted sum model that includes variables for credit level criteria and corresponding weight.

14. The method of claim 9, further comprising associating a work claim ticket with the request.

15. A system for ranking a plurality of users in a network, the system comprising:
a first computing device comprising:
a ranking managing module for maintaining a ranking for each of the plurality of users based on a plurality of communication response credentials, wherein the communication response credentials for each of the plurality of users indicates one or more credits earned by each of the users;
a communication module configured to receive a communication including a request for information from a second computing device, wherein the request is user input at the second computing device; and
a request processing module configured to:
determine one or more of the plurality of users to send the request for information based on the communication response credentials;
generate one or more weighted pathways between the second computing device and at least one third computing device associated with one or more of the plurality of users, wherein the weighted pathways are weighted based on the communication response credentials;
communicating the request for information to the at least one third computing device associated with the one or more of the plurality of users;
adjusting at least one credit level of the one or more other users based on the received at least one response to the request for information;
managing the weighted pathways for requesting information between computing devices associated with information requesters among the plurality of computing devices and computing devices of the one or more others users based on the at least one credit level and based on requests for information input by the information requesters and their associated computing devices
dynamically change the one or more weighted pathways based on the communication response credentials; and
direct requests for information to the at least one third computing device based on the dynamically changes weighted pathways,
wherein the communication module communicates the request for information to the at least one third computing device associated with the one or more of the plurality of users.

16. The system of claim 15, wherein the ranking managing device of the first computing device is further configured to determine the ranking of each of the plurality of users based on at least one of a correctness of responses received from the plurality of users, a time taken for responding to the request for information by the plurality of users, availability of the plurality of users, responsiveness to a communication by the plurality of users, and ranking of the each of the plurality of users given by other users of the plurality of users, and wherein the request processing module is configured to dynamically change the one or more weighted pathways based on the ranking of each of the plurality of users.

17. The system of claim 15, wherein the request processing module is configured to dynamically strengthen or weaken the one or more weighted pathways based on the communication response credentials.

18. The system of claim 15, wherein the request processing module is configured to prevent the second computing device from receiving another request based on the communication response credentials.

19. The system of claim 15, wherein the request processing module is configured to maintain the ranking by applying a weighted sum model that includes variables for credit level criteria and corresponding weight.

20. The system of claim 15, wherein the request processing module is configured to associate a work claim ticket with the request.

* * * * *